United States Patent
Zhang et al.

(10) Patent No.: US 11,809,318 B2
(45) Date of Patent: Nov. 7, 2023

(54) MEMORY ARCHITECTURE FOR EFFICIENT SPATIAL-TEMPORAL DATA STORAGE AND ACCESS

(71) Applicant: Pony AI Inc., Grand Cayman (KY)

(72) Inventors: Yubo Zhang, Los Gatos, CA (US); Pingfan Meng, Dublin, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 17/563,923

(22) Filed: Dec. 28, 2021

(65) Prior Publication Data

US 2022/0121573 A1 Apr. 21, 2022

Related U.S. Application Data

(63) Continuation of application No. 16/709,217, filed on Dec. 10, 2019, now Pat. No. 11,210,221.

(51) Int. Cl.
*G06F 12/08* (2016.01)
*G06F 12/02* (2006.01)
(Continued)

(52) U.S. Cl.
CPC ...... *G06F 12/0811* (2013.01); *G06F 12/0292* (2013.01); *G06F 12/0835* (2013.01); *G06F 12/0851* (2013.01); *G06F 12/1045* (2013.01)

(58) Field of Classification Search
CPC .. G06F 12/08; G06F 12/0811; G06F 12/0851; G06F 12/02; G06F 12/0292; G06F 12/1045
See application file for complete search history.

(56) References Cited

U.S. PATENT DOCUMENTS 10,810,786 B2 * 10/2020 Matsunobu ............... G06T 9/00
2004/0258147 A1 * 12/2004 Lee ........................ H04N 19/51
375/240

(Continued)

FOREIGN PATENT DOCUMENTS

WO WO-2017020680 A1 * 2/2017 ............... H04B 7/04

OTHER PUBLICATIONS

Y.-H. Chen and Y.-Y. Liu, "Dual-addressing memory architecture for two-dimensional memory access patterns," 2013 Design, Automation & Test in Europe Conference & Exhibition (DATE), Grenoble, France, 2013, pp. 71-76.*

(Continued)

*Primary Examiner* — Pierre Michel Bataille

(57) ABSTRACT

Described herein are systems, methods, and non-transitory computer readable media for memory address encoding of multi-dimensional data in a manner that optimizes the storage and access of such data in linear data storage. The multi-dimensional data may be spatial-temporal data that includes two or more spatial dimensions and a time dimension. An improved memory architecture is provided that includes an address encoder that takes a multi-dimensional coordinate as input and produces a linear physical memory address. The address encoder encodes the multi-dimensional data such that two multi-dimensional coordinates close to one another in multi-dimensional space are likely to be stored in close proximity to one another in linear data storage. In this manner, the number of main memory accesses, and thus, overall memory access latency is reduced, particularly in connection with real-world applications in which the respective probabilities of moving along any given dimension are very close.

16 Claims, 7 Drawing Sheets

(51) Int. Cl.
*G06F 12/0811* (2016.01)
*G06F 12/0846* (2016.01)
*G06F 12/1045* (2016.01)
*G06F 12/0831* (2016.01)

(56) References Cited

U.S. PATENT DOCUMENTS

| | | | | |
|---|---|---|---|---|
| 2006/0143454 | A1* | 6/2006 | Walmsley | G06F 21/85 |
| | | | | 713/170 |
| 2010/0145993 | A1* | 6/2010 | Rakib | G06F 9/3891 |
| | | | | 707/E17.014 |
| 2013/0057770 | A1* | 3/2013 | Asai | G06F 12/06 |
| | | | | 348/E9.037 |
| 2015/0301167 | A1* | 10/2015 | Sentelle | H01Q 9/27 |
| | | | | 342/22 |
| 2017/0329702 | A1* | 11/2017 | Gruenewald | G01S 13/28 |
| 2020/0217666 | A1* | 7/2020 | Zhang | G01C 21/1656 |
| 2020/0244501 | A1* | 7/2020 | Shattil | H04B 1/69 |

OTHER PUBLICATIONS

C. Ancourt, T. Petrisor, F. Irigoin and E. Lenormand, "Automatic Generation of Communications for Redundant Multi-dimensional Data Parallel Redistributions," 2013 IEEE 10th International Conference on High Performance Computing and Communications hangjiajie, China, 2013, pp. 800-811.*

C. Ancour et al., "Automatic Generation of Communications for Redundant Multi-dimensional Data Parallel Redistributions," 2013 IEEE 10th International Conference on High Performance Computing and Communications & 2013 IEEE International Conference on Embedded and Ubiquitous Computing, Zhangjiajie, China 2013.*

* cited by examiner

MEMORY ARCHITECTURE FOR EFFICIENT SPATIAL-TEMPORAL DATA STORAGE AND ACCESS

CROSS REFERENCE TO RELATED APPLICATIONS

This application is a continuation application of U.S. Ser. No. 16/709,217, filed Dec. 10, 2019, the content of which is hereby incorporated by reference in its entirety.

TECHNICAL FIELD

The present invention relates generally to memory architectures, and more particularly, in some embodiments, to memory architectures for efficient spatial-temporal data storage and access.

BACKGROUND

A flat memory model or linear memory model refers to a memory addressing paradigm in which memory appears to a program as a single contiguous address space. In such a model, a central processing unit (CPU) can directly (and linearly) address all of the available memory without having to resort to any type of memory segmentation or paging schemes. Memory management and address translation may nonetheless, however, be implemented on top of a linear memory model to facilitate operating system functionality, resource protection, multi-tasking or to increase the memory capacity beyond the limits imposed by the processor's physical address space.

Virtual memory addressing is a memory management technique that provides an idealized abstraction of the storage resources that are actually available on a given machine. A computer's operating system, using a combination of hardware and software, maps memory addresses used by a program (referred to as virtual addresses) into physical addresses in computer memory. Main storage, from the perspective of a process or task, appears as a contiguous address space or collection of contiguous segments. The operating system manages virtual address spaces and the assignment of physical memory to virtual memory. Address translation hardware in the CPU, referred to as a memory management unit (MMU), automatically translates virtual addresses to physical addresses. Software within the operating system may extend these capabilities using, for example, a paging technique to provide a virtual address space that can exceed the capacity of physical memory, and thus, reference more memory than is physically present in the computer.

Regardless of whether a linear memory addressing scheme is utilized according to which physical memory is directly and linearly addressed or a virtual addressing scheme is utilized according to which a virtual address space appears contiguous and is linearly addressed but is potentially mapped to non-contiguous sections of physical memory, the order in which data is stored and accessed from memory may not reflect real-world characteristics of the data. Existing memory addressing schemes fail to adequately reflect real-world characteristics of certain types of data, and thus, suffer from a number of technical drawbacks relating thereto. Technical solutions that address at least some of these drawbacks are described herein.

SUMMARY

Described herein are systems, methods, and non-transitory computer readable media for memory address encoding of multi-dimensional data in a manner that optimizes the storage and access of such data in linear data storage. The multi-dimensional data may include respective data associated with each of any number of dimensions. In example embodiments, the multi-dimensional data may be spatial-temporal data that includes two or more spatial dimensions and a time dimension. In example embodiments, an improved memory architecture is provided that includes an address encoder that takes a multi-dimensional coordinate as input and produces a linear physical memory address. The address encoder encodes the multi-dimensional data in such a manner that two multi-dimensional coordinates that are close to one another in multi-dimensional space are likely to be stored in close proximity to one another in linear data storage. In this manner, the number of main memory accesses, and thus, overall memory access latency may be reduced, particularly in connection with real-world applications in which the respective probabilities of moving along any given dimension from one multi-dimensional coordinate to another are very close.

In an example embodiment, a computer-implemented method for memory address encoding of multi-dimensional data that includes first multi-dimensional data and second multi-dimensional data is disclosed. The method includes applying an address encoding to the first multi-dimensional data to obtain a first memory address for the first multi-dimensional data and applying the address encoding to the second multi-dimensional data to obtain a second memory address for the second multi-dimensional data. The second multi-dimensional data is obtained from the first multi-dimensional data by incrementing by one unit respective data of the first multi-dimensional data that corresponds to a particular dimension. The method further includes storing the first multi-dimensional data in a memory at the first memory address and storing the second multi-dimensional data in the memory at the second memory address. The address encoding ensures that a linear difference between the second memory address and the first memory address is bounded independently of a size of any dimension of the multi-dimensional data.

In an example embodiment, a system for memory address encoding of multi-dimensional data that includes first multi-dimensional data and second multi-dimensional data is disclosed. The system includes at least one processor and at least one memory storing computer-executable instructions. The at least one processor is configured to access the at least one memory and execute the computer-executable instructions to perform a set of operations. The set of operations includes applying an address encoding to the first multi-dimensional data to obtain a first memory address for the first multi-dimensional data and applying the address encoding to the second multi-dimensional data to obtain a second memory address for the second multi-dimensional data. The second multi-dimensional data is obtained from the first multi-dimensional data by incrementing by one unit respective data of the first multi-dimensional data that corresponds to a particular dimension. The set of operations further includes storing the first multi-dimensional data in a memory at the first memory address and storing the second multi-dimensional data in the memory at the second memory address. The address encoding ensures that a linear difference between the second memory address and the first memory address is bounded independently of a size of any dimension of the multi-dimensional data.

In an example embodiment, a computer program product for memory address encoding of multi-dimensional data that includes first multi-dimensional data and second multi-dimensional data is disclosed. The computer program product includes a non-transitory computer-readable medium readable by a processing circuit. The non-transitory computer-readable medium stores instructions executable by the processing circuit to cause a method to be performed. The method includes applying an address encoding to the first multi-dimensional data to obtain a first memory address for the first multi-dimensional data and applying the address encoding to the second multi-dimensional data to obtain a second memory address for the second multi-dimensional data. The second multi-dimensional data is obtained from the first multi-dimensional data by incrementing by one unit respective data of the first multi-dimensional data that corresponds to a particular dimension. The method further includes storing the first multi-dimensional data in a memory at the first memory address and storing the second multi-dimensional data in the memory at the second memory address. The address encoding ensures that a linear difference between the second memory address and the first memory address is bounded independently of a size of any dimension of the multi-dimensional data.

The following additional features of example embodiments of the invention can be implemented in connection with any of the above-described method, system, or computer program product. In an example embodiment, the first multi-dimensional data and the second multi-dimensional data represent spatial-temporal data. In an example embodiment, the first multi-dimensional data includes first data corresponding to a first dimension and second data corresponding to a second dimension. In an example embodiment, applying the address encoding to the first multi-dimensional data to obtain the first memory address includes identifying a first bit representation of the first data, identifying a second bit representation of the second data, and interleaving the first bit representation and the second bit representation to obtain the first memory address.

In an example embodiment, interleaving the first bit representation and the second bit representation includes grouping together a first set of bits including a least significant bit of the first bit representation and a least significant bit of the second bit representation and appending one or more additional sets of bits to the first set of bits in successively more significant bit positions to obtain the first memory address, where each additional set of bits includes a respective bit at a same bit position from each of the first data and the second data.

In an example embodiment, the memory is a main memory, and a method or a set of operations configured to be performed by a system disclosed herein includes receiving a first memory access request to access the first multi-dimensional data and applying the address encoding to the first multi-dimensional data to obtain the first memory address. The method/set of operations further includes determining, based at least in part on at least a portion of the first memory address, that the first multi-dimensional data is not stored in cache memory, retrieving, from the main memory, a data block comprising the first multi-dimensional data, and storing the data block in the cache memory.

In an example embodiment, the above-described method/set of operations further includes receiving a second memory access request to access the second multi-dimensional data and applying the address encoding to the second multi-dimensional data to obtain the second memory address. The method/set of operations additionally includes determining, based at least in part on at least a portion of the second memory address, that the second multi-dimensional data is stored in the cache memory and retrieving the second multi-dimensional data from the cache memory, where the data block previously stored in the cache memory further comprises the second multi-dimensional data.

In an example embodiment, the above-described data block corresponds in size to a smallest cache line of the cache memory. In an example embodiment, based at least in part on the address encoding, a probability that the data block also includes the second multi-dimensional data is greater than fifty percent. More generally, in an example embodiment, the address encoding ensures that the linear difference between the first memory address and the second memory address is within $2^{(4k-1)}$ with a probability of $2^{(-k)}$ for $k \geq 1$.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
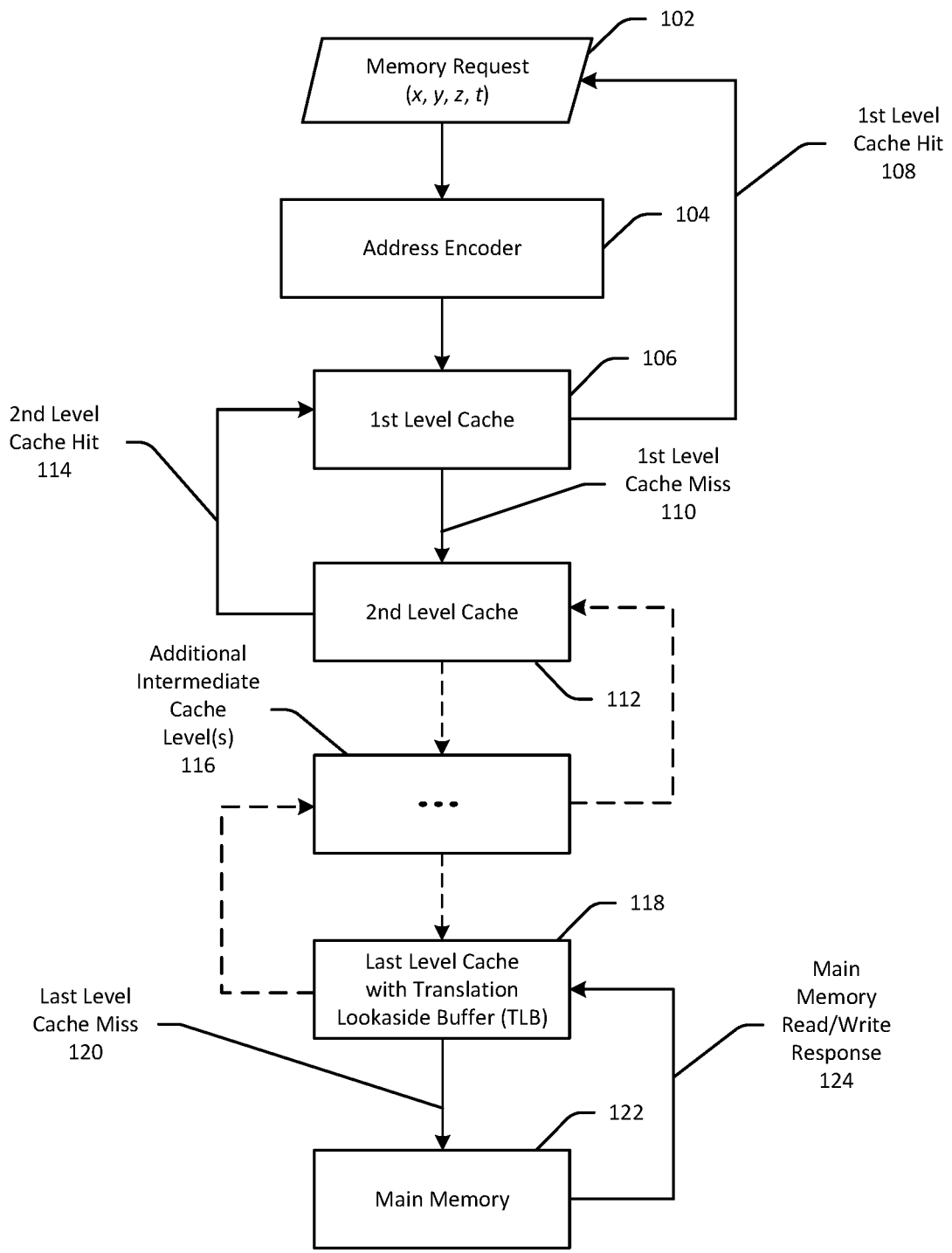
FIG. 1 illustrates a sequence of memory accesses in response to a memory request for spatial-temporal data in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Example embodiments of the invention relate to, among other things, systems, methods, computer-readable media, techniques, and methodologies for encoding memory addresses for multi-dimensional data using an address encoder that enables more efficient storage and access of such data. More specifically, example embodiments of the invention relate to an improved memory architecture that includes an address encoder configured to encode memory addresses in a manner that more closely reflects real-world characteristics of multi-dimensional data such as spatial-temporal data.

In example embodiments, the multi-dimensional data may be multi-coordinate data that includes respective data (e.g., a respective coordinate value) for each of multiple spatial dimensions, and optionally, respective data for a time dimension. In particular, in example embodiments, the multi-coordinate data may be N-dimensional data, where two or more dimensions are spatial dimensions, and optionally, one dimension is a time dimension. Generally speaking, the N-dimensional multi-coordinate data can be represented as $(s_1, s_2, \ldots, s_{n-1}, t)$, where $s_i$ represents a coordinate value corresponding to the ith spatial dimension and t represents a coordinate value corresponding to the time dimension. In certain example embodiments, a time dimension may not be represented, in which case, the N-dimensional multi-coordinate data can simply be represented as $(s_1, s_2, \ldots, s_n)$. As non-limiting examples, the multi-coordinate data may be two-dimensional (2D) data represented by coordinates having the form (x, y); three-dimensional (3D) data represented by coordinates having the form (x, y, z); 4D data represented by coordinates having the form (x, y, z, t); and so forth. As used herein, the term "4D coordinate data" or variants thereof refers to data having three spatial dimensions and one time dimension.

Each dimension may have a respective size associated therewith that determines the range of coordinate values capable of being represented for that dimension. For instance, if a particular dimension (e.g., the x coordinate direction) has a corresponding size of W, then x coordinate values may be in the range of zero to W. In certain example embodiments, a coordinate value may be any real value within a range of values. In other example embodiments, a particular dimension may take on a discrete set of coordinate values within a range of values in unit value increments. The unit value (or simply unit) may be any suitable integer or decimal value. For ease of explanation, example embodiments of the invention are described herein assuming an integer unit value. Further, the terms dimension and coordinate direction, or variations thereof, may at times be used interchangeably herein.

Example embodiments of the invention relate to an improved memory architecture that enables the storage and access of multi-dimensional data such as spatial-temporal data in linear data storage in a manner that more accurately reflects the relationship between the multi-dimensional data in multi-dimensional space. More specifically, an improved memory architecture in accordance with example embodiments of the invention includes an address encoder that encodes multi-coordinate data in a manner ensuring that two coordinates that are close to one another in the multi-dimensional space (e.g., an N-dimensional Euclidean distance between the two coordinates is small) are likely to be stored in close proximity to one another in linear data storage.

As such, when first multi-dimensional data (e.g., a coordinate represented as $(s_1, s_2, \ldots, s_{n-1}, t)$) is retrieved from main memory and stored in a cache memory in response, for example, to a memory access request for the data, the improved memory architecture and associated memory address encoder according to example embodiments of the invention increases the likelihood that second multi-dimensional data that is close to the first multi-dimensional data in multi-dimensional space will also have been retrieved from the main memory in the same data block with the first multi-dimensional data and stored in the cache memory. This, in turn, reduces the number of main memory accesses that may be needed to retrieve requested multi-dimensional data, thereby reducing the overall latency associated with memory accesses, and constituting a technological improvement over linear memory architectures with respect to the storage and access of multi-dimensional data such as spatial-temporal data. As used herein, a data block may refer to a cache line, which corresponds to a smallest eligible unit of data transfer between main memory and cache memory. A cache line can have any suitable byte size depending on the memory architecture such as, for example, 64 kilobytes (KB), 128 KB, 256 KB, or the like. In example embodiments, if any memory location within a cache line is read or written, the entire cache line is read or written.

Linear memory architectures typically assume that all data being read and written are linear, where a read request includes a scalar memory address and a scalar data length and a write request includes a scalar memory address and a linear data buffer to be written. A linear memory architecture usually has one or more levels of cache memory (e.g., data caches) for improved access latency. A data block being read/written can be stored in a data cache, which is faster and smaller than main memory. If subsequent read/write requests hit the same data block, there is no need to access the main memory, which can be more than a magnitude slower than the data cache access. The data temporarily stored in the data cache is used instead.

While conventional linear memory architectures are generally able to store any type of data as long as the data can be serialized into a linear data buffer, they fail to capture the semantics behind real-world data, and thus, fail to achieve optimized memory access performance with respect to such data. Real-world data such as sensor data is often represented as 4D coordinate data with spatial coordinates (x, y, z) and a timestamp t. Assume, for example, that a 4D array of numbers $D(x, y, z, t)$ is provided representing a collection of 4D coordinates. Assume further that the coordinate directions x, y, z, and t have respective dimension sizes W, H, D, and T. That is, in the example being presented, values for the spatial coordinate x can range from 0 to W−1; values for the spatial coordinate y can range from 0 to H−1; values for the spatial coordinate z can range from 0 to D−1; and values for the time coordinate t can range from 0 to T−1. As such, the 4D array $D(x, y, z, t)$ has a total dimension size of $W*H*D*T$.

A conventional linear memory architecture would, for example, store data of the example 4D array described above in linear memory M(k) with the memory address k given by $k=x+y*W+z*W*H+t*W*H*D$. For a memory access pattern in which 4D coordinate (x, y, z, t) is first accessed followed by 4D coordinate (x+1, y, z, t), it is likely that the second memory access would result in a cache hit because the first memory access would also bring into cache memory other data that is in the same data block that was fetched in response to the first memory access, that is, data that is located in main memory near the retrieved data at memory address k, such as the data at memory address k+1. If, however, the memory access pattern is changed to one according to which 4D coordinate (x, y, z, t) is first accessed followed by 4D coordinate (x, y+1, z, t), then the respective memory addresses would be k and k+W, and if W (the dimension size of the x coordinate) is large, it is unlikely that the second memory access would result in a cache hit. This is because it becomes much less likely that the first memory access for the data stored at memory address k would bring into the cache memory the data stored at memory address k+W, which would be located far away from memory address k when W is large. The likelihood of a cache hit is even smaller if—after the first memory access for 4D coordinate (x, y, z, t)—the second memory access is for 4D coordinate (x, y, z+1, t) or for 4D coordinate (x, y, z, t+1), which correspond to memory address $k+W*H$ and memory address $k+W*H*D$, respectively.

Thus, conventional linear memory architectures favor certain memory access patterns such as moving along a particular dimension (e.g., in the x-direction). This bias towards a particular coordinate direction results in the technical problem of poor memory access performance in real-world applications where the respective probabilities of moving in any coordinate direction are substantially the same, such as robotics applications, vehicle navigation applications, or the like. It should be appreciated that this technical problem of poor memory access performance exists with respect to conventional linear memory architectures regardless of the particular coordinate direction in which there is a coordinate bias. For instance, referring again to the example 4D array described above, the memory address k at which a 4D coordinate (x, y, z, t) is stored may instead be given by $k=y+x*H+z*H*W+t*H*W*D$, in which case, the linear memory architecture would have a bias in the y-coordinate direction. In such an example scenario, a memory access pattern in which 4D coordinate (x, y, z, t) is first accessed followed by 4D coordinate (x+1, y, z, t) would likely result in a cache miss for the second memory access due to the coordinate bias in the y-coordinate direction. Similarly, a conventional linear architecture may alternatively have a coordinate bias in the z or t directions.

Example embodiments of the invention provide a technical solution to the above-described technical problem in the form of an improved memory architecture that includes a memory address encoder that applies an address encoding to multi-dimensional data to enable storage of the data in linear data storage in a manner that more accurately reflects the real-world semantics of the data. More particularly, an improved memory architecture and address encoder in accordance with example embodiments of the invention ensures that two coordinates that are close to one another in the multi-dimensional space are more likely to be stored in close proximity to one another in linear data storage as compared to conventional linear memory architectures. Specifically, the improved memory architecture and address encoder described herein ensures that the linear difference between two memory addresses respectively corresponding to two coordinates that differ by an increment of one unit in a particular coordinate direction (dimension) is bounded independently of a respective size of any dimension regardless of the direction in which the two coordinates differ. This, in turn, increases the likelihood of cache hits for multi-dimensional data that differs from previously accessed multi-dimensional data with respect to any direction/dimension.

As a result, the improved memory architecture according to example embodiments of the invention does not favor any particular coordinate direction, and thus, substantially mitigates the technical problem of coordinate bias posed by conventional linear memory architectures. By optimizing the storage of multi-dimensional coordinate data in linear data storage in a manner that substantially mitigates coordinate bias, example embodiments of the invention increase likelihood and number of cache hits, and as a result, reduce overall memory latency, which constitutes an improvement to the functioning of a computer, and more specifically, an improvement to linear computer memory architectures. Specific implementations of the improved memory architecture and the address encoder in accordance with example embodiments of the invention will be described in more detail later in this disclosure through reference to the various Figures.

In various other example application scenarios, it may, in fact, be desirable for a memory architecture to have a certain degree of coordinate bias. For instance, if a particular type of access pattern occurs more frequently than other types of access patterns, it may be desirable to provide a memory address encoding that favors the more frequently observed access pattern in order to increase the likelihood of cache hits for memory requests. For example, memory access patterns for map data corresponding to a vehicle route along relatively flat terrain may more frequently access data in the x and y coordinate directions as opposed to the z direction, in which case, a memory address encoding that provides a coordinate bias in the x and y directions over the z direction may be desirable. As another non-limiting example, memory access patterns for map data corresponding to a vehicle route along relatively straight but hilly terrain may more frequently access data in the x and z coordinate directions or data in the y and z coordinate directions, in which case, a memory address encoding that provides a coordinate bias against the x direction or against the y direction may be desirable.

In some example embodiments, the type of data being read or written may influence the type of coordinate bias that may be desirable. For instance, if map data is being read/written, a desired coordinate bias may be determined, at least in part, from the navigation route being traversed by a vehicle. If, on the other hand, sensor data (e.g., LiDAR data) is being read/written, a desired coordinate bias may be determined from factors other than the navigation route such as objects being scanned in an environment surrounding the vehicle. More specifically, in a non-limiting example, a coordinate bias in the x/y directions may be desirable with respect to map data for a vehicle navigation route that mostly covers flat terrain, while a coordinate bias in the z direction may be desirable with respect to sensor data (e.g., a LiDAR scanning a tall building) even while the vehicle is travelling along the flat terrain route. In addition, one or more constraints associated with the data itself may be indicative of a desirable coordinate bias. For instance, map data may include constraints (e.g., buildings, road surfaces, geographic features, etc.) that would prevent vehicle travel in certain directions. As a result, memory access patterns may result in different coordinate directions being more frequently accessed for different portions of the map data based on such constraints.

As previously noted, conventional linear memory architectures suffer from the technical problem of coordinate bias in a particular direction which can lead to poor memory access latency in application scenarios involving memory access patterns that do not significantly favor any particular direction. Example embodiments of the invention directed to an improved memory architecture that includes an address encoder that substantially mitigates coordinate bias in any particular direction constitutes a technical solution to this technical problem. In addition, by exhibiting a coordinate bias in a particular direction, conventional linear memory architectures also suffer from the technical problem of poor memory access performance in application scenarios involving memory access patterns that favor a different direction from the biased direction. Certain example embodiments of the invention also provide a technical solution to this technical problem faced by conventional linear memory architectures of exhibiting a coordinate bias in a direction that is different from a direction favored by memory access patterns by providing a memory architecture that is configured to dynamically determine an address encoding to use to encode multi-dimensional data such as multi-coordinate data.

More specifically, as memory access patterns change and the corresponding coordinate directions favored by such access patterns also change, example embodiments of the invention can dynamically determine the address encoding that provides the desired coordinate bias (or no coordinate bias) for the current memory access pattern. As a result, the memory address encoding can dynamically change to more closely match the current memory access pattern, which increases the likelihood and number of cache hits and reduces overall memory access latency, thereby improving the functioning of the computer. Dynamically determining the address encoding may include dynamically generating the address encoding at least partially concurrently with a memory read/write request or selecting the address encoding from a set of preconfigured address encodings. Specific implementations for dynamically determining address encodings in accordance with example embodiments of the invention will be described in more detail later in this disclosure through reference to the various Figures.

Figure 5:
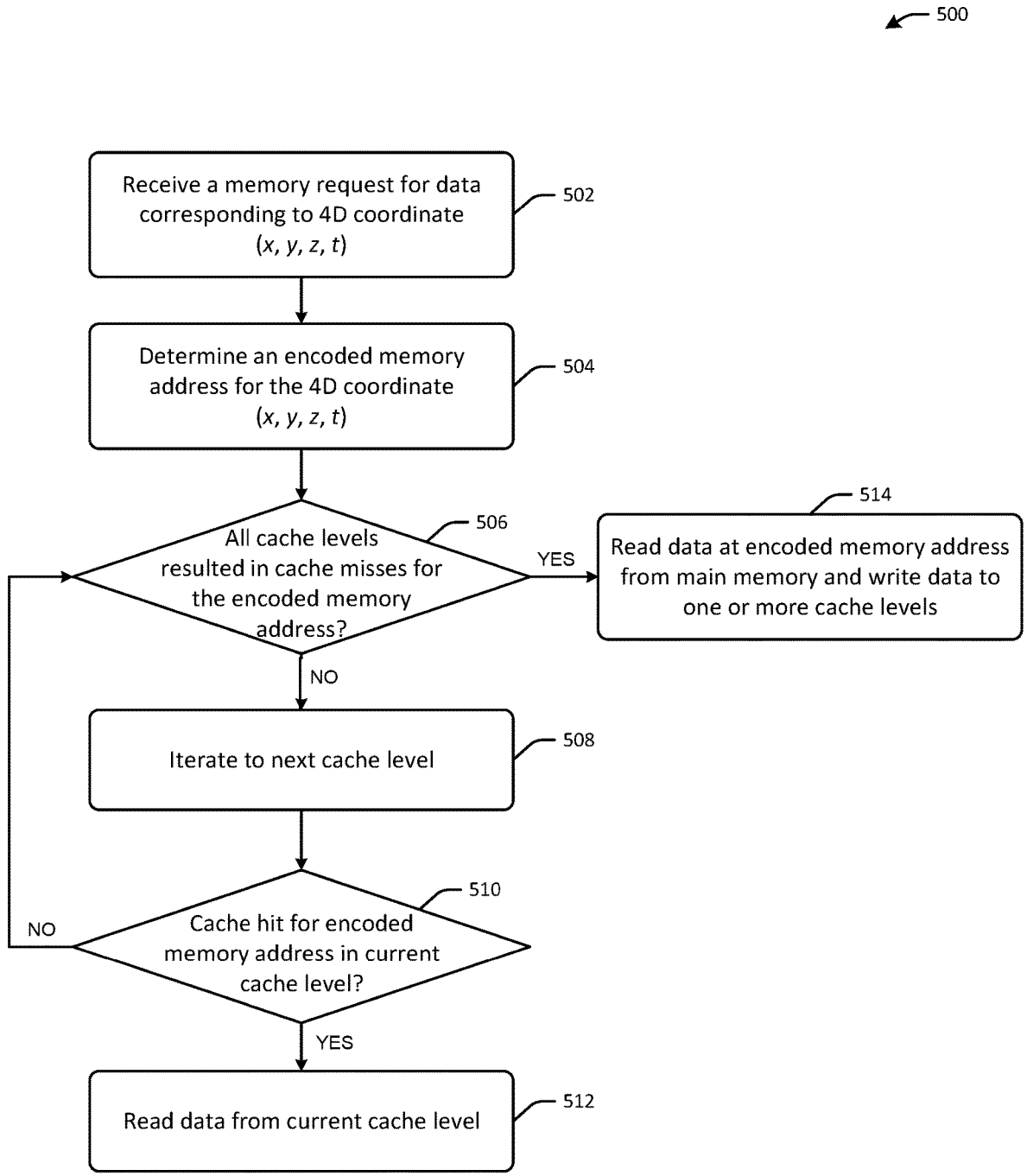
FIG. 5 is a process flow diagram of an illustrative method for accessing spatial-temporal data in memory that is encoded using a 4D memory address encoding in accordance with an example embodiment of the invention.

FIG. 1 illustrates a sequence of memory accesses in response to a memory request for spatial-temporal data in accordance with an example embodiment of the invention. FIG. 5 is a process flow diagram of an illustrative method 500 for accessing spatial-temporal data in memory that is encoded using a 4D memory address encoding in accordance with an example embodiment of the invention. FIGS. 1 and 5 will be described in reference to one another hereinafter. While the example method 500 of FIG. 5 may be described herein in reference to a 4D coordinate system, it should be appreciated that the method 500 can be extrapolated to any multi-dimensional coordinate system.

Each operation of any method described herein can be performed by one or more of the engines/program modules depicted in FIG. 1 or FIG. 7, whose operation will be described in more detail hereinafter. These engines/program modules can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. In example embodiments, these engines/program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring now to FIG. 5 in reference to FIG. 1, at block 502 of the method 500, a memory request 102 may be received for a 4D coordinate (x, y, z, t), which includes three spatial dimensions x, y, and z as well as the time dimension t. The memory request 102 may be a request for map data, sensor data, or the like. The memory request 102 may be received from a location-based services (LBS) application such as a navigation application; a sensor-based application; a robotics application; or the like. While the example method 500 will be described in the context of a memory request 102 that is a read request, it should be appreciated that memory architectures and associated memory address encoders described herein can be used to encode data corresponding to a write request as well.

At block 504 of the method 500, an encoded memory address for the 4D coordinate (x, y, z, t) may be determined. In some example embodiments, the address encoding to use to determine the encoded memory address for the 4D coordinate to which the memory request 102 relates may be dynamically determined. These example embodiments will be described in more detail later in this disclosure in reference to FIG. 6. The example method 500 of FIG. 5 assumes that the address encoding to be used is predetermined. More specifically, the example method 500 assumes that the address encoding that is applied at block 504 to determine the encoded memory address is one that minimizes coordinate bias with respect to any particular dimension (coordinate direction).

In particular, in example embodiments, the address encoding used at block 504 to determine the encoded memory address for the 4D coordinate (x, y, z, t) may be based on a technique that interleaves bit representations of the various coordinate values of the 4D coordinate to obtain the encoded memory address. More specifically, in example embodiments, an address encoder 104 may be provided. The address encoder 104 may be configured to receive the 4D coordinate (x, y, z, t) as input and generate the encoded memory address.

In example embodiments, the address encoder 104 may determine a respective bit representation for each coordinate value of the 4D coordinate. For instance, the bit representation for the x coordinate value may be given by: $x=x_n x_{n-1} \ldots x_1 x_0$, where $x_0$ is the least significant bit (LSB) and $x_n$ is the most significant bit (MSB). Similarly, the bit representations for the other coordinate values may be given by: $y=y_n y_{n-1} \ldots y_1 y_0$; $z=z_n z_{n-1} \ldots z_1 z_0$; and $t=t_n t_{n-1} \ldots t_1 t_0$. Thus, the example 4D coordinate (8, 13, 22, 34) would have the following bit representations for the x, y, z, and t coordinate values, respectively: 1000; 1101; 10110; and 100010.

It should be appreciated that depending on the coordinate values, the corresponding bit representations may have a differing number of bits. For instance, the bit representation for the x coordinate value 8 from the example above is 1000, but the bit representation for the t coordinate value 34 is 100010. However, for the purposes of the interleaving scheme utilized by the address encoder 104 to obtain the encoded memory address according to example embodiments of the invention, the address encoder 104 may add leading zeros to one or more bit representations as needed to ensure that all bit representations include the same number of bits corresponding to the bit length for memory addresses utilized by the memory architecture.

While bit representations for different coordinate values may be described herein, in connection with certain example embodiments of the invention, as including the same number of bits through the addition of leading zeros if necessary, such example bit representations may not necessarily reflect the total number of bits used for memory addresses in a given memory architecture. For instance, based on the addition of leading zeros, respective bit representations for the x, y, z, and t coordinate values for the example above may be 001000, 001101, 010110, 100010, respectively. While these example bit representations now have the same bit length, they may not reflect the actual bit length for memory addresses (e.g., 32-bit, 64-bit, etc.). In some example embodiments, leading zeros may be added as necessary to the bit representations to ensure that the bit representations have a bit length that equals the bit length used for memory addresses. In other example embodiments, leading zeros may be added as necessary to an output obtained from manipulating the bit representations in order to obtain an encoded memory address for the 4D coordinate that has the appropriate bit length.

In example embodiments of the invention, the address encoder 104 may be configured to applying an interleaving scheme to the respective bit representations of the coordinate values of the 4D coordinate (x, y, z, t) to obtain the encoded memory address for the 4D coordinate. More specifically, the output from the address encoder 104 (the encoded memory address) may be given by: $k=t_n z_n y_n x_n t_{n-1} z_{n-1} y_{n-1} x_{n-1} \ldots t_0 z_0 y_0 x_0$. Thus, in example embodiments, the encoded memory address k may be obtained by interleaving the bit representations of the different coordinate values in such a manner that movement in any particular coordinate direction is generally not favored over movement in any other coordinate direction, that is, in a manner that avoids, or at a minimum, substantially reduces coordinate bias. Specifically, the interleaved encoded memory address k is obtained by first grouping together the bit values in a LSB position in each bit representation, and then successively moving to more significant bit positions in each bit representation, grouping together the bit values that are at a same bit position in each bit representation, and appending those grouped values to successively more significant bit positions in the interleaved output in order to ultimately obtain the encoded memory address k.

As a non-limiting example, assume that the memory request 102 received at block 502 is for the 4D coordinate (8, 13, 22, 34) from the example introduced earlier. As previously noted, the bit representations for the x, y, z, and t coordinate values are 1000, 1101, 10110, and 100010, respectively. After adding leading zeros to the bit representations for the x, y, and z coordinate values so that they have the same number of bits as the bit representation for the t coordinate value, we have the following bit representations: x=001000, y=001101, z=010110, and t=100010. These specific bit representations correspond to the following generalized bit representations: $x=x_5 x_4 x_3 x_2 x_1 x_0$; $y=y_5 y_4 y_3 y_2 y_1 y_0$, $z=z_5 z_4 z_3 z_2 z_1 z_0$, and $t=t_5 t_4 t_3 t_2 t_1 t_0$. Applying the interleaving scheme described above, the output of the address encoder 104 for these generalized bit representations would be given by $k=t_5 z_5 y_5 x_5 t_4 z_4 y_4 x_4 t_3 z_3 y_3 x_3 t_2 z_2 y_2 x_2 t_1 z_1 y_1 x_1 t_0 z_0 y_0 x_0$, which for the example 4D coordinate (8, 13, 22, 34) would be k=100001000011011011000010, which is illustratively shown as having a bit length of 24. If the memory architecture utilizes 32 bits for memory addresses, then 8 leading zeros may be appended to k above to yield k=00000000100001000011011011000010 as the encoded memory address. Alternatively, leading zeros may be appended to each of the bit representations to make them 32 bits in length such that the k obtained via the interleaving technique described above would already have the necessary bit length.

Referring in more detail to the interleaving technique described above, in constructing the encoded memory address k, the address encoder 104 may first group together the respective bit values in the least significant bit position of each bit representation, which in generalized form would be given by $t_0 z_0 y_0 x_0$, and for the specific example introduced above, 0010. Then, the address encoder 104 may successively group together respective bit values from the same increasingly more significant bit positions in each bit representation and append them in correspondingly more significant bit positions to the current encoder output. For instance, the bit values corresponding to the next more significant bit position in each bit representation (e.g., $t_1 z_1 y_1 x_1$) are grouped together to obtain 1100, which is then appended to 0010 to obtain 11000010. This is followed by the grouping together of the bit values corresponding to the successive next more significant bit position in each bit representation (e.g., $t_2 z_2 y_2 x_2$) to obtain 0110, which is then appended to 11000010 to obtain 011011000010. The address encoder 104 continues with this process until the bit values in the MSB position of each bit representation are grouped together and appended to the current encoder output to obtain the final encoded memory address.

The interleaving technique described above according to which memory addresses for N-dimensional coordinates are obtained by interleaving the bit representations of the N-dimensional coordinates results in the storage of multi-coordinate data in linear data storage in a manner that ensures that N-dimensional coordinates that are close to one another in N-dimensional space (as determined, for example, based on the N-dimensional Euclidean distance between the coordinates) are also likely to be stored in proximity to one another in linear data storage. As a result, coordinate bias is significantly reduced. In certain example embodiments, the order in which the bit representations of the different coordinate values are interleaved may be swizzled to potentially even further reduce coordinate bias. For instance, in example embodiments, the memory address encoding may be changed to alter the interleaving order from $t_n z_n y_n x_n t_{n-1} z_{n-1} y_{n-1} x_{n-1} \ldots t_0 z_0 y_0 x_0$ to $x_n y_n z_n t_n x_{n-1} y_{n-1} z_{n-1} t_{n-1} \ldots x_0 y_0 z_0 t_0$; $t_n x_n y_n z_n t_{n-1} x_{n-1} y_{n-1} z_{n-1} \ldots t_0 x_0 y_0 z_0$; or the like. In example embodiments, the interleaving order may be changed periodically or based on observed memory access patterns.

More specifically, the address encoding technique described above according to example embodiments of the invention ensures that given a first N-dimensional coordinate $(c_n, c_{n-1}, \ldots, c_1, c_0)$, if any particular coordinate value $c_i$ is incremented by one unit value to obtain a second N-dimensional coordinate, then a linear difference between the encoded memory address for the first N-dimensional coordinate and the encoded memory address for the second N-dimensional coordinate is bounded independently of the size of any of the N dimensions.

In particular, example embodiments of the invention that utilize an address encoding that employs the example interleaving scheme described above for example, provide a probabilistic distribution for the likelihood that any two encoded memory addresses are within are given bounded distance from one another in linear memory that is substantially more favorable than conventional linear memory architectures. More specifically, in example embodiments, the example interleaving scheme described above ensures that any two encoded memory addresses are stored in linear memory within a bounded distance given by $2^{(4i-1)}$ with a probability of $2^{(-i)}$ for $i \geq 1$. In this context, a bounded distance between any two memory addresses may refer to a maximum number of memory locations between the two memory addresses.

More specifically, the probabilistic distribution for the example interleaving scheme described above ensures that there is a $2^{(-1)}=\frac{1}{2}=50\%$ probability that any two encoded memory addresses are within a bounded distance of $2^{(4*1-1)}=2^3=8$. Proceeding similarly, for $i=2$, there is a $2^{(-2)}=\frac{1}{4}=25\%$ probability that any two encoded memory addresses are within a bounded distance of $2^{(4*2-1)}=2^7=128$; for $i=3$, there is a $2^{(-3)}=\frac{1}{8}=12.5\%$ probability that any two encoded memory addresses are within a bounded distance of $2^{(4*3-1)}=2^{11}=2048$; for $i=4$, there is a $2^{(-4)}=\frac{1}{16}=6.25\%$ probability that any two encoded memory addresses are within a bounded distance of $2^{(4*4-1)}=2^{15}=32768$; for $i=5$, there is a $2^{(-5)}=\frac{1}{32}=3.125\%$ probability that any two encoded memory addresses are within a bounded distance of $2^{(4*5-1)}=2^{19}=524288$; and so on. As the value of i increases, the corresponding bounded distance increases exponentially and the corresponding probability approaches zero. The cumulative probability converges to 100%. Thus, for the example interleaving scheme described above, there is a 75% chance that any two encoded memory addresses are within a bounded distance of 128. In particular, if we assume a cache line capable of holding no less than 128 values, for example, the probabilistic distribution for the example 4D interleaving technique described above ensures a 75% cache hit rate for a second memory access following a first memory access.

For example, as detailed above, the memory address $k_1$ for the example 4D coordinate (8, 13, 22, 34) would be given by $k_1$=10000100001101101100010. If we obtained another 4D coordinate by incrementing the x coordinate value by one (i.e., (9, 13, 22, 34)), then the memory address $k_2$ for that incremented 4D coordinate would be given by $k_2$=10000100001101101100011. The linear difference between $k_1$ and $k_2$ is 1, which is clearly less than the bounded distance of 8 that the probabilistic distribution for the example interleaving technique ensures will occur 50% of the time. Similarly, other example 4D coordinates obtained by incrementing by one unit the y, z, and t coordinate directions of the example 4D coordinate (8, 13, 22, 34) would be (8, 14, 22, 34), (8, 13, 23, 34), and (8, 13, 22, 35), respectively. The encoded memory addresses for these incremented 4D coordinates would then be given by: $k_3$=10000100001101101100000; $k_4$=10000100001101101100110; and $k_5$=10000100001101101001010, respectively. Then, the linear difference between $k_3$ and $k_1$ is 30; the linear difference between $k_4$ and $k_1$ is 4; and the linear difference between $k_5$ and $k_1$ is 8. Therefore, for the example 4D coordinate (8, 13, 22, 34), three of the four 4D coordinates obtained by incrementing a coordinate value for a particular coordinate direction by a unit value are within the bounded distance of 8, and all of the four 4D coordinates are within the bounded distance of 128. As such, if a first memory access corresponds to the 4D coordinate (8, 13, 22, 34), a second memory access for any of the four 4D coordinates obtained by incrementing a particular coordinate value of the 4D coordinate (8, 13, 22, 34) by a unit value would have a cache hit rate of 100% assuming a cache line of no less than 128 values. Thus, in this example, the cache hit rate is even greater than what is guaranteed by the probabilistic distribution.

In contrast, consider the probabilistic distribution associated with a conventional linear memory architecture according to which an example 4D coordinate (x, y, z, t) is stored in linear memory M(k) at a memory address k given by $k=x+y*W+z*W*H+t*W*H*D$, where W, H, and D represent the dimensional sizes of the x, y, and z coordinate directions, respectively. It is clear then that the probabilistic distribution for such a conventional linear memory architecture would provide: a 25% probability that the distance between two memory addresses is 1 (if, for example, the two memory addresses differ only by a unit value with respect to the x coordinate direction); a 25% probability that the distance between two memory addresses is between W and W*H (if, for example, the two memory addresses differ with respect to the y coordinate direction); a 25% probability that the distance between two memory addresses is between W*H and W*H*D (if, for example, the two memory addresses differ with respect to the z coordinate direction); and a 25% probability that the distance between two memory addresses is W*H*D or greater (if, for example, the two memory addresses differ with respect to the z coordinate direction). It should be appreciated that W, H, and D may be arbitrarily large numbers.

The probabilistic distribution for the example conventional linear memory architecture described above provides a much smaller guaranteed cache hit rate than the probabilistic distribution for an address encoding in accordance with example embodiments of the invention that utilizes the example interleaving technique described above. In particular, if we assume, for example, a cache line of no less than 128 values and a value for W that is greater than 128 (which will be the case for most types of meaningful real-world data), the probabilistic distribution for the conventional linear memory architecture ensures a cache hit rate of only 25%, which is significantly worse than what is ensured by the probabilistic distribution provided by the example interleaving technique according to example embodiments (i.e., 75%). Even if we assume a smaller cache line (e.g., no less than 64 values) or a W that is less than 128, the cache hit rate for the 4D interleaving scheme according to example embodiments of the invention would be 50%, whereas the cache hit rate for the conventional linear addressing scheme would be 25%. Therefore, the example interleaving technique according to example embodiments of the invention provides a significantly higher likelihood that any two encoded memory addresses are within a much smaller bounded distance than the conventional linear memory architecture, and thus, a much higher cache hit rate and a resulting significantly lower memory access latency.

Figure 2:
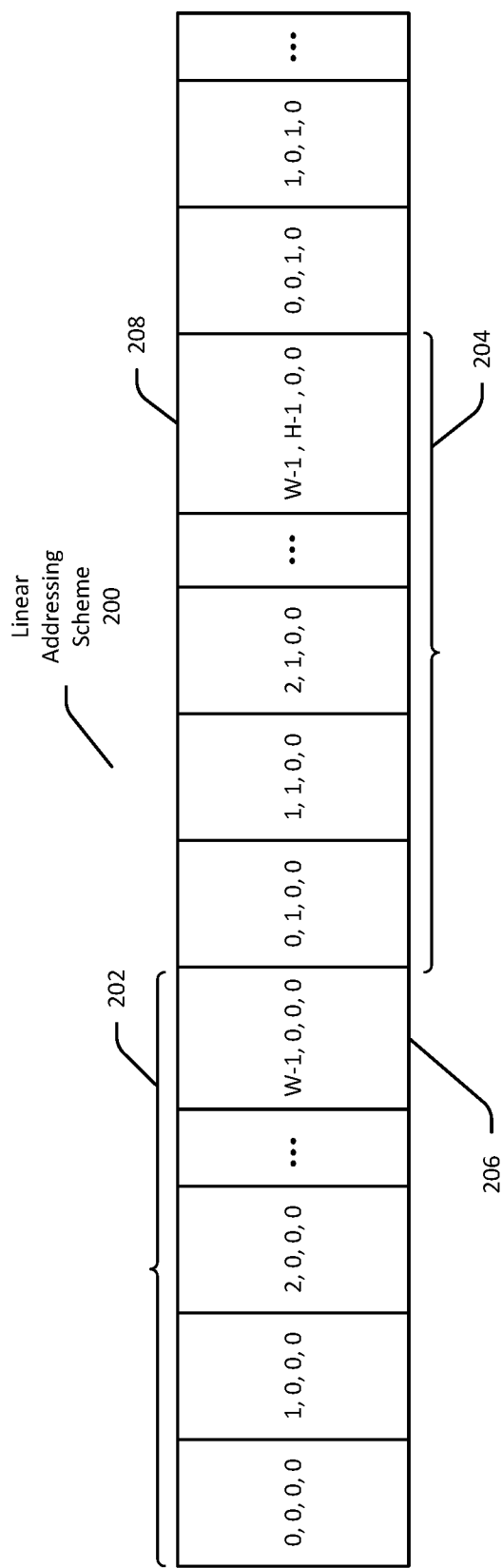
FIG. 2 illustrates a linear memory addressing scheme for spatial-temporal data.

An improved memory architecture and address encoding according to example embodiments of the invention will now be described in more detail in reference to FIG. 3, which illustrates an example memory addressing scheme for 4D spatial-temporal data. This addressing scheme will be contrasted with how the same 4D spatial-temporal data would be stored in a conventional linear addressing scheme, as shown in FIG. 2. It should be appreciated that the actual data (e.g., the actual 4D coordinate values) are shown as being stored in linear memory in both FIG. 2 and FIG. 3, but the order in which the data is stored is reflective of the underlying addressing scheme that is employed.

Referring first to FIG. 2, 4D coordinate data stored in accordance with a conventional linear addressing scheme 200 is shown. The linear addressing scheme 200 may, for example, store a 4D coordinate (x, y, z, t) in linear memory at a memory address k given by k=x+y*W+z*W*H+t*W*H*D, where W, H, and D represent the sizes of the x, y, and z dimensions (coordinate directions), respectively. Consider, for example, the two 4D coordinates (0, 0, 0, 0) and (0, 1, 0, 0). These two coordinates are close to one another in 4D space because they differ only by a unit value (e.g., the integer one) with respect to the y coordinate direction. The memory address $k_0$ for the 4D coordinate (0, 0, 0, 0) is zero, while the memory address $k_1$ for the 4D coordinate (0, 1, 0, 0) is W, which equals the sum of $k_0$ and the size of the x dimension—W. In contrast, the 4D coordinate (1, 0, 0, 0) is similarly close to the 4D coordinate (0, 0, 0, 0)—they also differ only by a value of one but in the x coordinate direction rather than the y coordinate direction. According to the linear addressing scheme 200, however, the 4D coordinates (0, 0, 0, 0) and (1, 0, 0, 0) are stored in adjacent memory locations.

Thus, the linear addressing scheme 200 exhibits a coordinate bias in the x coordinate direction. In particular, assuming that the size of the x dimension is W—meaning that the x coordinate value can range from 0 to W−1—the set of 4D coordinates 202 including the 4D coordinate (0, 0, 0, 0) and each 4D coordinate having a non-zero value for the x coordinate direction and zero values for the other coordinate directions would be stored in a contiguous section of linear memory. The 4D coordinate (0, 1, 0, 0) would be stored in linear memory adjacent to the 4D coordinate 206 (i.e., (W−1, 0, 0, 0)), which represents a spatial-temporal coordinate in which the x coordinate value is the largest candidate value for the x coordinate direction and the coordinate values for the other coordinate directions are zero. Thus, as a result of the coordinate bias in the x coordinate direction exhibited by the linear addressing scheme 200, the 4D coordinate (0, 1, 0, 0) is stored W memory locations away from the 4D coordinate (0, 0, 0, 0) whereas the 4D coordinate (1, 0, 0, 0) is stored in an adjacent memory location to the 4D coordinate (0, 0, 0, 0) despite both the coordinates (1, 0, 0, 0) and (0, 1, 0, 0) being the same distance from the coordinate (0, 0, 0, 0) in 4D space, and thus, equally likely to be accessed after accessing the 4D coordinate (0, 0, 0, 0) in connection with a variety of application scenarios.

Moreover, the coordinate bias in the x coordinate direction exhibited by the linear addressing scheme 200 is even more pronounced with respect to the z coordinate direction. For example, consider the 4D coordinate (0, 0, 0, 0) and the 4D coordinate obtained by incrementing the z coordinate value by a unit value (i.e., (0, 0, 1, 0)). As depicted in FIG. 2, the set of 4D coordinates 204 beginning with the 4D coordinate (0, 1, 0, 0) and ending with the 4D coordinate 208 (i.e., (W−1, H−1, 0, 0)) would be stored in a contiguous section of linear memory that is adjacent to the contiguous section of linear memory in which the set of 4D coordinates 202 is stored. The 4D coordinate (0, 0, 1, 0) would be stored in a memory location adjacent to the memory location in which the 4D coordinate 208 is stored. Thus, according to the linear addressing scheme 200 and because of the coordinate bias it exhibits in the x coordinate direction, the 4D coordinate (0, 0, 1, 0) would be stored W*H memory locations away from the 4D coordinate (0, 0, 0, 0) in linear memory despite the 4D coordinate (0, 0, 1, 0) being the same distance in 4D space from the coordinate (0, 0, 0, 0) as the 4D coordinates (1, 0, 0, 0) and (0, 1, 0, 0) are. Although not depicted in FIG. 2, the coordinate bias in the x coordinate direction exhibited by the example linear addressing scheme 200 becomes even more pronounced with respect to the t coordinate direction. For example, the 4D coordinate (0, 0, 0, 1) would be stored in a memory location that is W*H*D memory locations away from the memory location at which the 4D coordinate (0, 0, 0, 0) is stored. Thus, despite each of the 4D coordinates (1, 0, 0, 0), (0, 1, 0, 0), (0, 0, 1, 0), and (0, 0, 0, 1) being the same distance in 4D space from the 4D coordinate (0, 0, 0, 0), the coordinates are stored progressively farther away in linear memory from the coordinate (0, 0, 0, 0) due to the coordinate bias in the x coordinate direction exhibited by the linear addressing scheme 200. As such, the likelihood of cache misses for memory requests for 4D data increases, and as a result, the overall memory access latency increases. This leads to a drop in performance and diminished functioning of the computer, particular in connection with application scenarios in which memory access patterns do not favor any particular coordinate direction.

Figure 3:
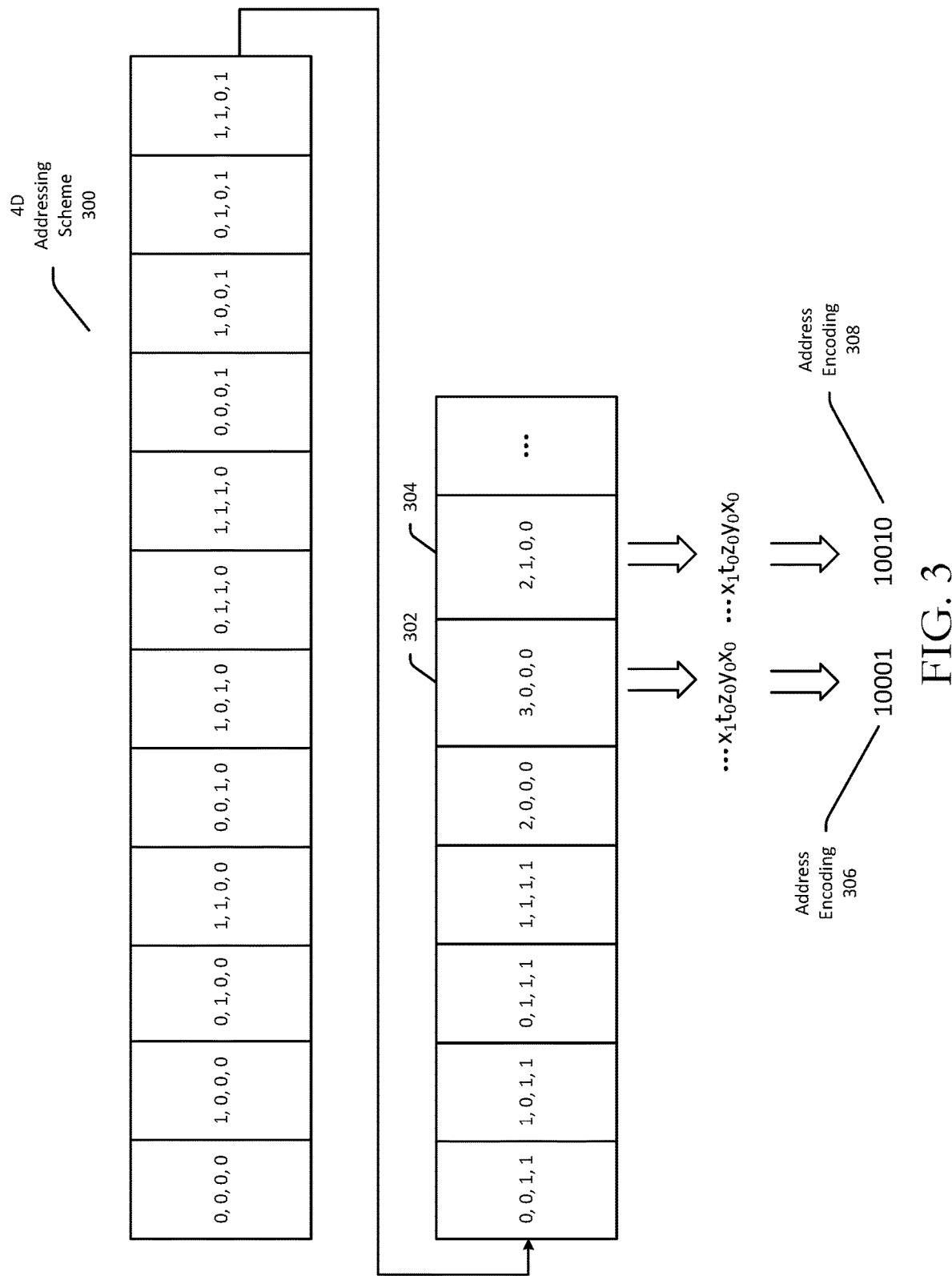
FIG. 3 illustrates a four-dimensional (4D) memory addressing scheme for spatial-temporal data in accordance with an example embodiment of the invention.

Referring now to FIG. 3, a 4D memory addressing scheme 300 is illustratively depicted. The 4D memory addressing scheme 300 may be utilized in example embodiments of the invention by an improved memory architecture and address encoder described herein. FIG. 3 depicts the order in which a collection of 4D coordinates beginning with an origin 4D coordinate (0, 0, 0, 0) and ending with the 4D coordinate (2, 1, 0, 0) are stored in linear memory. As shown in FIG. 3, each of the 4D coordinates (1, 0, 0, 0), (0, 1, 0, 0), and (0, 0, 0, 1) obtained by incrementing a respective x, y, or z coordinate value of the origin coordinate (0, 0, 0, 0) by one is stored within 8 or less memory locations of the memory location at which the origin coordinate (0, 0, 0, 0) is stored. Stated another way, the respective linear difference between a respective memory location at which each of the 4D coordinates (1, 0, 0, 0), (0, 1, 0, 0), and (0, 0, 0, 1) is stored and the memory location at which the origin coordinate (0, 0, 0, 0) is stored is bounded independently of a respective size of any of the x, y, z, or t dimensions. In particular, in this example, the linear difference is 8 or less, which is likely to be significantly smaller than a respective size of any of the dimensions. Stated more generally, according to the example 4D memory addressing scheme 300, the linear difference between any two memory locations respectively corresponding to two 4D coordinates is ensured to be within a given bounded distance at a corresponding probability, where the bounded distance is independent of the respective size of any dimension, and in most cases, is probabilistically significantly smaller than the respective size of any dimension.

As a result of this bounding characteristic provided by its probabilistic distribution, the example 4D memory addressing scheme 300 is much more likely than the conventional linear addressing scheme 200 to store any two 4D coordinates that are close to one another in 4D space in relative proximity in linear memory. As a result, the example 4D memory addressing scheme 300 substantially mitigates coordinate bias in any particular coordinate direction and solves a fundamental technical problem of conventional linear memory architectures, particularly with respect to real-world application scenarios that do not exhibit memory access patterns that favor any particular coordinate direction. As previously noted, the linear memory addressing scheme 200 requires, for example, all 4D coordinates of the form (x, 0, 0, 0), where $0 \geq x \geq W$, W=size of x dimension, to be stored in a contiguous section of linear memory such that the 4D coordinate (0, 1, 0, 0) and the 4D origin coordinate (0, 0, 0, 0) are stored W memory locations away from one another. Moreover, according to the linear addressing scheme 200, the 4D coordinates (0, 0, 1, 0) and (0, 0, 0, 1) are stored in memory locations that are even farther from the memory location at which the origin coordinate is stored. This is the case despite the fact that the 4D coordinates (0, 1, 0, 0), (0, 0, 1, 0), and (0, 0, 0, 1) are all equidistant to the origin coordinate. In sharp contrast, however, the 4D memory addressing scheme 300 does not exhibit the linear addressing scheme's 200 coordinate bias in the x coordinate direction or in any coordinate direction for that matter. For example, as shown in FIG. 3, each of the 4D coordinates (0, 1, 0, 0), (0, 0, 1, 0), and (0, 0, 0, 1) are stored in linear memory prior to the storage of all 4D coordinates of the form (x, 0, 0, 0), where $0 \geq x \geq W$, W=size of x dimension.

FIG. 3 depicts the order in which 4D coordinate values are stored in linear memory under the example 4D memory addressing scheme 300. The memory address of each successive memory location is obtained by incrementing the memory address of an immediately prior memory location by one. In particular, each 4D coordinate whose corresponding memory address is obtained by interleaving the bit representations of the coordinate values of the 4D coordinate is shown as being stored in the memory location corresponding to that memory address. For example, a 4D coordinate 302 may be stored at a memory location in linear memory corresponding to the encoded memory address 306. Similarly, a 4D coordinate 304 may be stored at a memory location in linear memory corresponding to the encoded memory address 308.

As a non-limiting example, assume that the 4D coordinate 302 is (3, 0, 0, 0). Then, the encoded memory address 306 produced by the address encoder 104 would be given by $k_1=10001$ (with leading zeros added as necessary to obtain the appropriate bit length of the memory address). In particular, the bit representations for the x, y, z, and t coordinate values of the 4D coordinate (3, 0, 0, 0) are 11; 00; 00; and 00, respectively (the respective bit representations are shown as including the same number of bits for ease of explanation). The corresponding generalized bit representations are $x_1x_0$; $y_1y_0$; $z_1z_0$; and $t_1t_0$, respectively. Applying the interleaving technique described earlier, the generalized memory address is given by . . . $t_1z_1y_1x_1t_0z_0y_0x_0$, where the ellipses represents potential leading zeros. Thus, $k_1=00010001=10001$ for the example 4D coordinate (3, 0, 0, 0). As previously noted, in some example embodiments, leading zeros may be appended to the respective bit representations prior to performing the interleaving.

The memory address $k_1=10001$ may be incremented by one to obtain the memory address $k_2$ for the subsequent adjacent memory location. Thus, the memory address for the subsequent memory location is given by $k_2=k_1+1=10001+00001=10010=00010010$. The memory address $k_2$, in turn, corresponds to the generalized interleaved bit representation . . . $t_1z_1y_1x_1t_0z_0y_0x_0$, where the ellipses represents potential leading zeros. Assuming that the memory address $k_2$ was obtained by interleaving the respective bit representations of the coordinate values of a particular 4D coordinate, it can be determined that the bit representations for the x, y, z, and t coordinate values that are interleaved to produce the memory address $k_2$ are 10; 01; 00; and 00, respectively. These bit representations, in turn, correspond to the 4D coordinate (2, 1, 0, 0).

The above-described example illustrates how the 4D memory addressing scheme 300 minimizes coordinate bias, in contrast to the linear addressing scheme 200. For example, while the 4D coordinate (3, 0, 0, 0) is stored in linear memory at a memory location that is subsequent and adjacent to the memory location at which the 4D coordinate (2, 0, 0, 0) is stored, the 4D coordinate (4, 0, 0, 0) is not then stored in a subsequent and adjacent memory location to the 4D coordinate (3, 0, 0, 0), as would be the case, for example, with the linear addressing scheme 200. Rather, according to the 4D memory addressing scheme 300, the 4D coordinate (2, 1, 0, 0) is stored in a subsequent and adjacent memory location to the 4D coordinate (3, 0, 0, 0) because the encoded memory address 10010 for the 4D coordinate (2, 1, 0, 0) corresponds to the encoded memory address for the 4D coordinate (3, 0, 0, 0) incremented by one.

Figure 4:
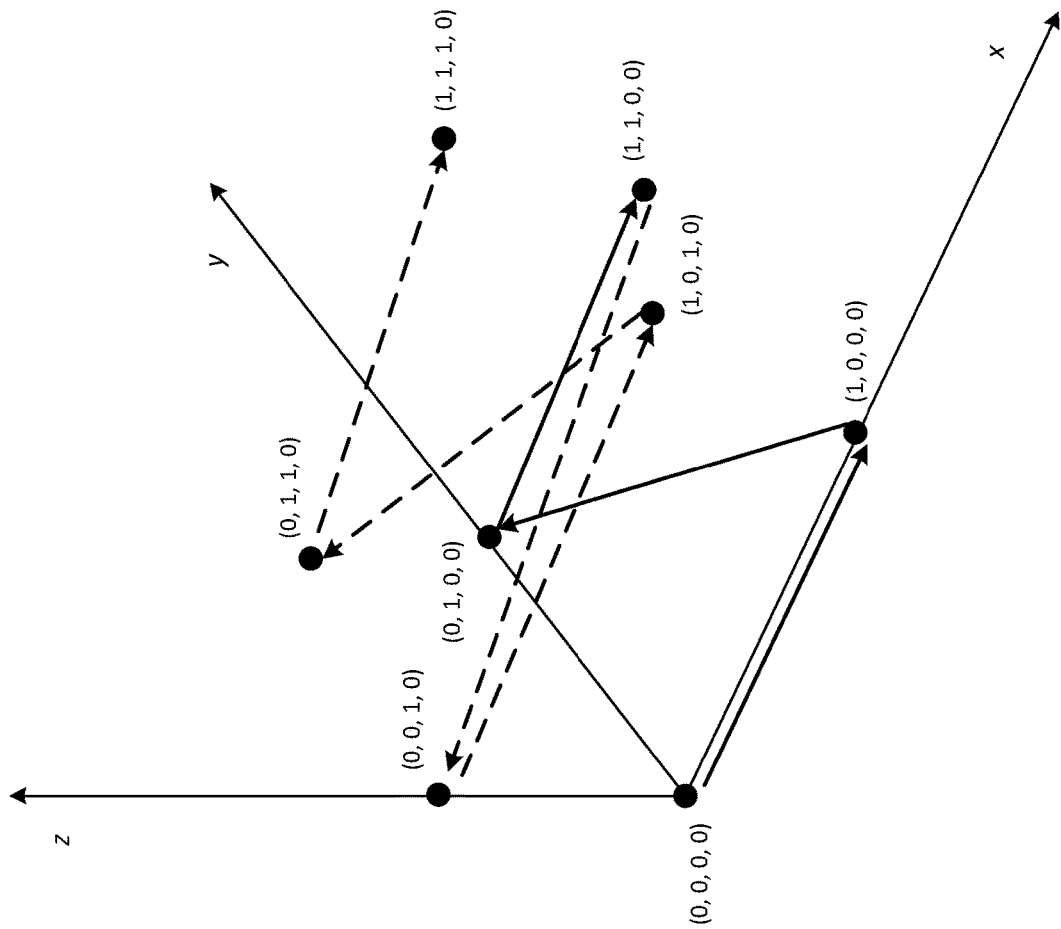
FIG. 4 illustrates a graphical depiction of a memory address encoding for spatial-temporal data in accordance with an example embodiment of the invention.

FIG. 4 illustrates a graphical depiction 400 of a memory address encoding for 4D spatial-temporal data in accordance with an example embodiment of the invention. More specifically, the depiction 400 provides a graphical illustration of the example 4D memory address encoding 300. The t coordinate value is assumed to be zero for each 4D coordinate depicted in FIG. 4. Thus, it should be appreciated that the depiction 400 does not graphically illustrate the order in which 4D coordinates with non-zero t coordinate values would be stored in linear memory according to the 4D memory address encoding 300. Further, solid lines are used to depict movement between coordinates where the z coordinate value is zero, and dashed lines are used to depict movement between coordinates where the z direction is non-zero.

As shown in FIG. 4, assume that the 4D coordinate (0, 0, 0, 0) is stored at a first memory location having the memory address $k_0=0$. Incrementing $k_0$ by one gives $k_1=k_0+1=0+1=1$, where $k_1$ is the memory address for the immediately subsequent and adjacent memory location to the first memory location. The memory address $k_1$ corresponds to the 4D coordinate (1, 0, 0, 0) based on the bit representation interleaving memory address encoding technique described herein. Continuing in this manner, $k_1$ is incremented by one to obtain the memory address for the next memory location. That is, the memory address for the next memory location $k_2=k_1+1=1+1=10$. The encoded memory address $k_2$ is the result of interleaving bit representations corresponding to the 4D coordinate (0, 1, 0, 0). Continuing in the same manner, the 4D coordinates (1, 1, 0, 0); (0, 0, 1, 0); (1, 0, 1, 0); (0, 1, 1, 0); and (1, 1, 1, 0) are stored in that order adjacent to the memory location at which the 4D coordinate (0, 1, 0, 0) is stored. Although not depicted in FIG. 4, it should be appreciated that the next 4D coordinate that would be stored in linear memory is (0, 0, 0, 1).

Thus, as depicted in FIG. 4, if one begins at the 4D origin coordinate (0, 0, 0, 0) and moves in any of the x, y, z, or t coordinate directions by one, the linear difference between the memory locations at which the two 4D coordinates are stored is less than or equal to 8, which is likely to be substantially smaller than the size of any of the dimensions and highly likely to result in cache hits. Stated more generally, the 4D memory addressing scheme 300 and its partial graphical depiction 400 have an associated probabilistic distribution that ensures that the linear difference between any two memory locations at which corresponding 4D coordinates are stored is within a given bounded distance at a corresponding probability, where the bounded distance is independent of the size of any dimension.

Referring again to FIG. 4 in reference to FIG. 1, once the encoded memory address is determined for the requested 4D coordinate (x, y, z, t), one or more cache memory levels may be accessed to determine if the 4D coordinate corresponding to the encoded memory address is stored in cache memory. More specifically, a computing device may have cache memory that is situated closer to a processing unit and that, as a result, provides faster data access speeds than main memory, which in turn, provides faster data access speeds than a hard disk. The cache memory may be organized into a hierarchy of two or more levels of cache memory. A first level of cache memory (which may be referred to as L1 cache or primary cache) may be built into a processor chip (e.g., a CPU), and thus, may sit closest to the processor and provide the fastest memory access. A second level of cache memory (which may be referred to as L2 cache) can also be built into the processor chip, packaged within the same module as the processor, or provided on the mother board. L2 cache provides a slower memory access speed than L1 cache but faster than lower levels of cache memory that may exist. In example embodiments, there may be one or more additional levels of cache memory below the L2 cache. Main memory provides slower data access than any level of cache memory and may be accessed to retrieve data that is not present in cache memory.

At block 506 of the method 500, a determination is made as to whether all levels of cache memory have been iterated through and have resulted in cache misses for the encoded memory address. In response to a negative determination at block 506, the method proceeds to block 508, where the next level of cache memory to be searched for the 4D coordinate corresponding to the encoded memory address is identified. In a first iteration, for example, a first level of cache memory 106 (e.g., the L1 cache) may be searched for the 4D coordinate data corresponding to the encoded memory address. At block 510 of the method 500, a determination is made as to whether a cache hit occurred for the encoded memory address in the current level of cache memory being searched. In response to a positive determination at block 510, the method 500 proceeds to block 512, where the requested 4D coordinate data is read from the current level of cache memory. On the other hand, if a cache miss occurs (a negative determination at block 510), the method 500 proceeds iteratively from block 506 and searches each additional lower level of cache memory until a cache hit occurs, or until a cache miss occurs at every cache level (a positive determination at block 506), in which case, the method would proceed to block 514. At block 514 of the method 500, the requested 4D coordinate data would be read from main memory and potentially written to one or more cache memory levels. In some example embodiments, the encoded memory address may be a virtual memory address that needs to be translated by a translation lookaside buffer (TLB) or the like to a physical memory address at which the requested 4D coordinate data is stored in main memory.

Referring again to the example memory hierarchy depicted in FIG. 1, if the 4D coordinate data corresponding to the encoded memory address is located in the first level of cache memory 106, a cache hit 108 occurs (a positive determination at block 510 of the method 500), and the requested data is read from the first level of cache memory 106 at block 512 of the method 500. On the other hand, if the data is not found in the first level of cache memory 106, a cache miss 110 occurs (a negative determination at block 510), and the method 500 proceeds from block 506. Since there are additional cache memory levels to check, a negative determination is made at block 506, and the next cache memory level (the second level of cache memory 112) is searched. If a cache hit 114 occurs at the second level of cache memory 112, the requested data is read from that cache level. On the other hand, if a cache miss occurs, the method 500 proceeds iteratively from block 506, checking each additional cache memory level until a cache hit occurs or until a cache miss 120 occurs at a last level of cache memory 118 (a positive determination at block 506), in which case, the encoded memory address may optionally be translated to a physical memory address, and a main memory 122 may be accessed to retrieve the requested data stored at the physical memory address. Specifically, a main memory read/write response 124 may be executed to read the requested data from main memory 122 and write the data to one or more cache memory levels.

Figure 6:
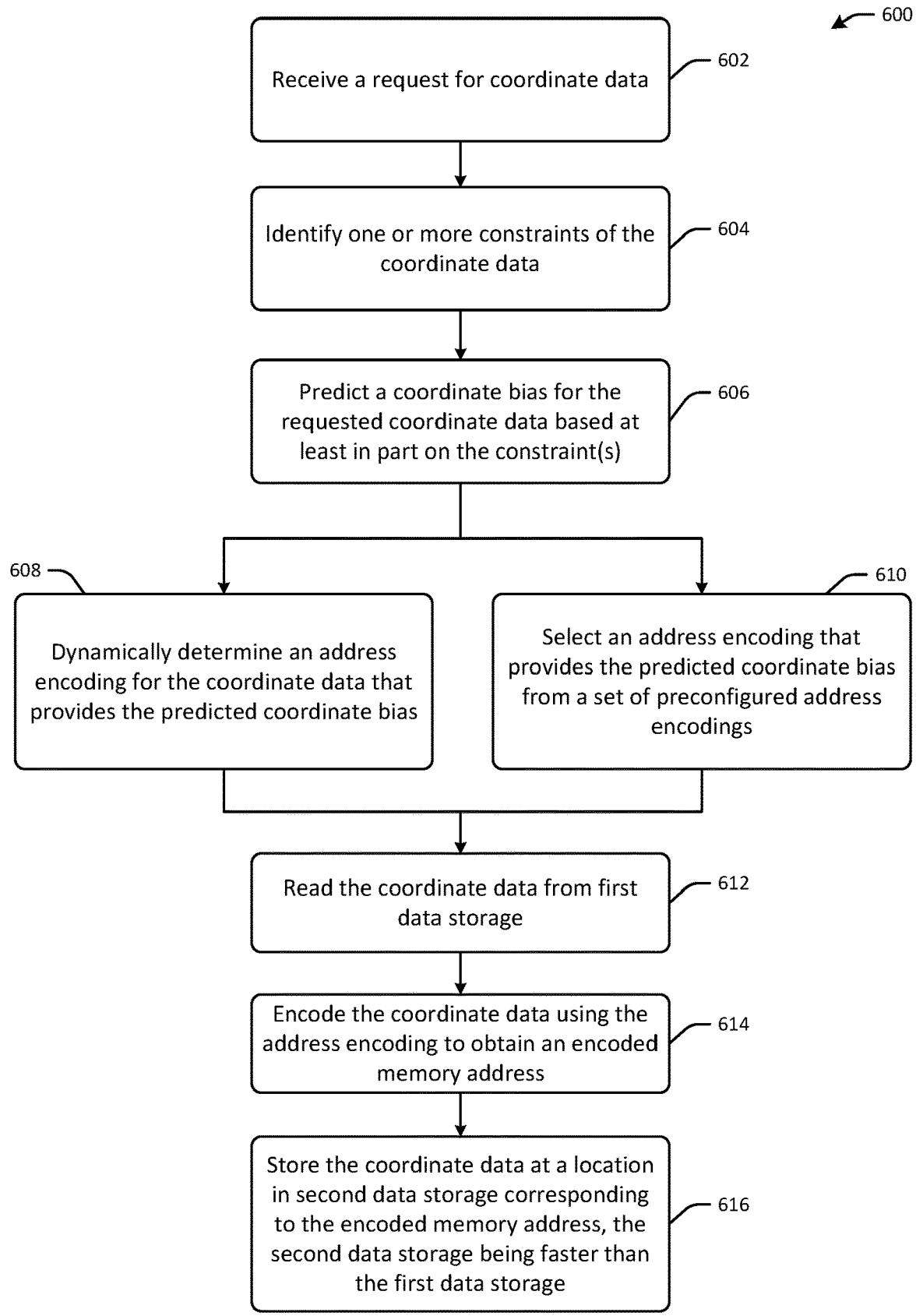
FIG. 6 is a process flow diagram of an illustrative method for dynamically determining an address encoding for multi-dimensional coordinate data in accordance with an example embodiment of the invention.

FIG. 6 is a process flow diagram of an illustrative method 600 for dynamically determining an address encoding for multi-dimensional coordinate data in accordance with an example embodiment of the invention. The method 600 may be performed, for example, in various example application scenarios in which it may be desirable for a memory architecture to exhibit a certain degree of coordinate bias. For instance, if a particular type of access pattern occurs more frequently than other types of access patterns, it may be desirable to provide a memory address encoding that favors the more frequently observed access pattern in order to increase the likelihood of cache hits for memory requests.

In example embodiments, a request for coordinate data may be received at block 602 of the method 600. The coordinate data may be, for example, multi-dimensional data such as multi-coordinate data. The multi-coordinate data may be, for instance, 4D data including three spatial dimensions and one time dimension. In some example embodiments, the request may be for map data and may be received from a navigation application. In other example embodiments, the request may be for sensor data or the like. In some example embodiments, the request may be sent by an application executing on a user device such as a smartphone or the like or a device that is integrated with a vehicle such as an autonomous vehicle (e.g., a sensor, an embedded device, a vehicle computer, etc.). In some example embodiments, the request may be received at a server that may be located remotely from the device that the requesting application is executing on. In other example embodiments, the request may be received at a device present in or integrated with a vehicle. While the method 600 may be illustratively described in connection with a memory read access request, it should be appreciated that the request received at block 602 may alternatively be a write request to write coordinate data or the like to data storage such as main memory.

At block 604 of the method 600, an address encoding determination/selection engine executing on the device that receives the request at block 602 may determine one or more constraints associated with the requested coordinate data. More specifically, in example embodiments of the invention, one or more constraints associated with the requested coordinate data may be indicative of a desirable coordinate bias. For instance, map data may include constraints in the form of physical obstacles (e.g., buildings, road surfaces, geographic features, etc.) that would prevent vehicle travel in certain directions. As a result, memory access patterns may result in different coordinate directions being more frequently accessed for different portions of the map data based on such constraints.

At block 606 of the method 600, the address encoding determination/selection engine may predict a coordinate bias for the requested coordinate data. The coordinate bias may be determined based on the memory access patterns observed or predicted to occur for the requested coordinate data. More specifically, the desired coordinate bias may be one that is predicted to increase the number/likelihood of cache hits for a memory access pattern that is observed or predicted to occur with respect to the requested coordinate data.

For example, memory access patterns for map data corresponding to a vehicle route along relatively flat terrain may more frequently access data in the x and y coordinate directions as opposed to the z direction, in which case, a memory address encoding that provides a coordinate bias in the x and y directions over the z direction may be desirable. As another non-limiting example, memory access patterns for map data corresponding to a vehicle route along relatively straight but hilly terrain may more frequently access data in the x and z coordinate directions or data in the y and z coordinate directions, in which case, a memory address encoding that provides a coordinate bias against the x direction or against the y direction may be desirable.

In some example embodiments, the type of data being accessed may influence the type of coordinate bias that may be desirable. For instance, if map data is being accessed, a desired coordinate bias may be determined, at least in part, from the navigation route being traversed by a vehicle, which may be predicted based on the vehicle speed, its direction of travel, and optionally, any constraints associated with the terrain being traversed. If, on the other hand, sensor data (e.g., LiDAR data) is being accessed, a desired coordinate bias may be determined from factors other than the navigation route such as objects being scanned in an environment surrounding the vehicle. More specifically, in a non-limiting example, a coordinate bias in the x/y directions may be desirable with respect to map data for a vehicle navigation route that mostly covers flat terrain, while a coordinate bias in the z direction may be desirable with respect to sensor data (e.g., a LiDAR with a wide z angle scanning capability) even if the vehicle is travelling along flat terrain.

In example embodiments of the invention, the address encoding determination/selection engine may further determine the desired coordinate bias within constraint(s) that may be imposed by the requested data itself. For instance, map data may include constraints in the form of obstacles (e.g., buildings, road surfaces, geographic features, etc.) that prevent or allow vehicle travel only in certain directions. As a result, memory access patterns may result in different coordinate directions being more frequently accessed for different portions of the map data based on such constraints. In some example embodiments in which the requested data is map data, the address encoding determination/selection engine may predict the desired coordinate bias based on a combination of factors including the current direction of travel; a predicted future direction of travel as determined from a vehicle navigation route; and constraints associated with the requested map data. Further, in some example embodiments, a coordinate direction may have inherent boundaries associated therewith, For example, the z coordinate direction is inherently bounded while the x, y, and t coordinate directions may not be.

From block 606, the method 600 may proceed to one of blocks 608 or 610. At block 608 of the method 600, the address encoding determination/selection engine may dynamically generate an address encoding for the coordinate data that provides the predicted coordinate bias. In example embodiments, map data may be sent to a requesting application (e.g., a vehicle navigation application) in portions referred to as tiles. After a map data tile is sent to the requesting application, the vehicle requires a certain amount of time to travel the corresponding physical distance covered by the map data tile. During this period of time, the address encoding determination/selection engine may predict the desired coordinate bias for the map data tile and dynamically generate the address encoding to use to provide that coordinate bias. As such, the latency associated with dynamically generating the address encoding to use for requested data can be minimized.

Alternatively, at block 610 of the method 600, the address encoding determination/selection engine may select an address encoding that provides the predicted coordinate bias from among a set of preconfigured address encodings. For instance, in some example embodiments, a respective address encoding may be determined offline for each retrievable portion of map data (e.g., each map data tile). The address encodings may then be stored in association with the corresponding portions of map data such that the appropriate preconfigured address encoding can be selected for the requested map data.

In some example embodiments, the dynamically generated or preconfigured address encoding may apply an interleaving scheme that provides the predicted coordinate bias. More specifically, in some example embodiments, in order to provide a coordinate bias in a particular coordinate direction, the address encoding may apply an interleaving scheme according to which the encoded memory address is obtained by taking a greater number of bits from the bit representation for the particular coordinate direction than from the bit representations for the other coordinate directions. For instance, assume a coordinate bias in the x coordinate direction is predicted. Assuming 4D coordinate data, the generalized bit representations for the x, y, z, and t coordinate directions are given by $x = \ldots x_4 x_3 x_2 x_1 x_0$; $y = \ldots y_4 y_3 y_2 y_1 y_0$; $z = \ldots z_4 z_3 z_2 z_1 z_0$; and $t = \ldots t_4 t_3 t_2 t_1 t_0$, respectively. The address encoding that has a coordinate bias in the x direction, for example, may then utilize an interleaving technique that produces an encoded memory address k given by $k = \ldots t_2 z_2 y_2 x_5 x_4 t_1 z_1 y_1 x_3 x_2 t_0 z_0 y_0 x_1 x_0$. Therefore, according to this example address encoding, the encoded memory address k includes a greater number of bits taken from the bit representation for the x coordinate value than from the bit representations for the other coordinate values, and thus, produces a coordinate bias in the x coordinate direction that favors memory access patterns that more frequently move along the x coordinate direction.

It should be appreciated that the example interleaving technique described above is merely illustrative and not exhaustive. For instance, while the example above describes interleaving two bits of the bit representation for the x coordinate value with every one bit from the bit representations of the other coordinate values, it should be appreciated that the address encoding may interleave an even greater number of bits from a bit representation for a coordinate value in which a coordinate bias is sought. In some example embodiments, the number of bits selected from a given bit representation of a given coordinate value may depend on the extent of coordinate bias that is desired with respect to that coordinate direction. For instance, in order to generate an even greater coordinate bias in the x coordinate direction, an example address encoding may instead interleave 3 bits from the bit representation for the x coordinate value with every one bit of the bit representations of the other coordinate values to produce an encoded memory address k given by k= . . . $t_1 z_1 y_1 x_5 x_4 x_3 t_0 z_0 y_0 x_2 x_1 x_0$.

Moreover, while dynamically generated or preconfigured address encodings have been illustratively described above in connection with a predicted coordinate bias in the x coordinate direction, it should be appreciated that the address encoding can provide a coordinate bias in any desired coordinate direction. For instance, if the predicted coordinate bias is in the z coordinate direction, then the address encoding may apply an interleaving technique that produces an encoded memory address k given by k= . . . $t_1 z_3 z_2 y_1 x_1 t_0 z_1 z_0 y_0 x_0$. In addition, in some example embodiments, a dynamically generated or preconfigured address encoding may produce a coordinate bias in more than one coordinate direction simultaneously. For instance, an example address encoding that provides a coordinate bias in the x and y directions simultaneously may produce an encoded memory address k given by k= . . . $t_1 z_1 y_3 y_2 x_3 x_2 t_0 z_0 y_1 y_0 x_1 x_0$.

In some example embodiments, it may be desirable to provide a non-spatial coordinate bias in the time dimension. For example, in certain applications scenarios such as object tracking, it may be desirable to collect/access data relating to the sequence of events. For instance, in autonomous vehicle driving scenarios, it is often necessary to predict the velocities and positions of objects (e.g., pedestrians, other vehicles, etc.), which can be done based on a historical trajectory of an object. In such example scenarios, it may be desirable to provide a coordinate bias in the t coordinate direction in order to enhance the predictive capacity of historical trajectory data.

Referring again to FIG. 6, at block 612 of the method 600, the requested coordinate data may be read from first data storage. The first data storage may be, for example, disk storage such as a hard disk drive. For instance, map data is generally voluminous, and thus, stored on disk storage. When map data is requested, it is typically loaded from disk and stored in main memory. In other example embodiments, the first data storage may be main memory or a particular level of cache memory. At block 614 of the method 600, an address encoder (e.g., the address encoder 104) may encode the retrieved coordinate data using the address encoding dynamically generated at block 608 or selected at block 610 to obtain an encoded memory address. Then, at block 616 of the method 600, the retrieved coordinate data may be stored at a memory location in second data storage corresponding to the encoded memory address. In example embodiments, the second data storage may be main memory, which provides a faster data access speed than disk storage. In other example embodiments, the second data storage may be a cache memory level that provides faster data access speeds than the first data storage, which in turn, may be main memory or a lower level of cache memory.

In some example embodiments, the data being stored in the second data storage (e.g., main memory) have already have an interleaving format associated therewith. In such example embodiments, the interleaving format may be read from metadata associated with the data and used to encode the data prior to storing the data in the second data storage. In other example embodiments, a prior interleaving format associated with data may be transformed into a desired interleaving format prior to storing the data in the second data storage.

As memory access patterns change and the corresponding coordinate directions favored by such access patterns also change, the example method 600 can be executed to dynamically determine the address encoding that provides the desired coordinate bias (or no or minimal coordinate bias) for the current memory access pattern. As a result, the memory address encoding can dynamically change to more closely match the current memory access pattern, which increases the likelihood and number of cache hits and reduces overall memory access latency, thereby improving the functioning of the computer.

Hardware Implementation

Figure 7:
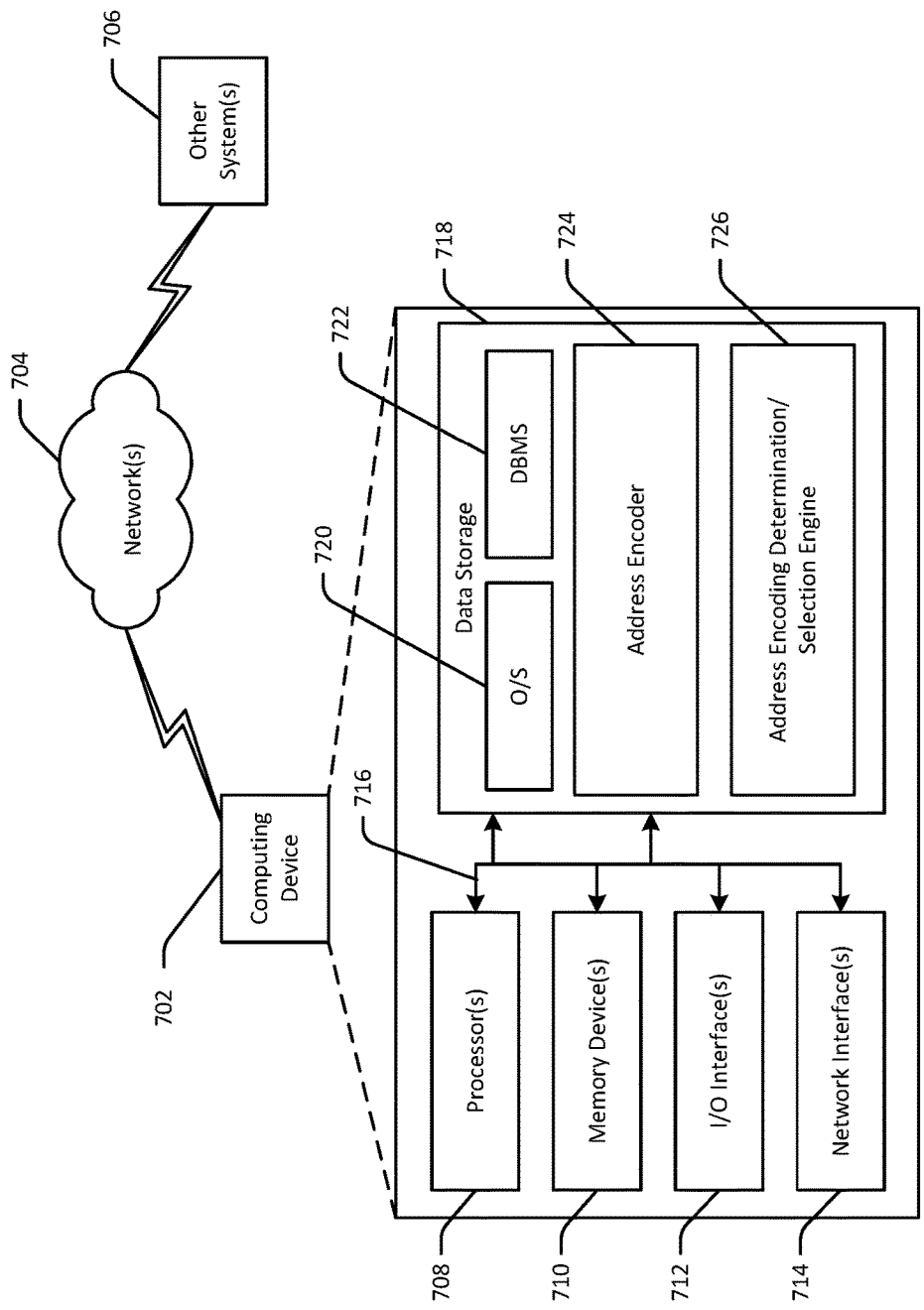
FIG. 7 is a schematic block diagram illustrating an example networked architecture configured to implement example embodiments of the invention.

FIG. 7 is a schematic block diagram illustrating an example networked architecture 700 configured to implement example embodiments of the invention. The networked architecture 700 can include one or more special-purpose computing devices 702 communicatively coupled via one or more networks 704 to one or more other systems 706. The other system(s) 706 may include, without limitation, sensors such as on-board vehicle sensors including, for example, LiDAR sensors, radars, cameras, GPS receivers, sonar-based sensors, ultrasonic sensors, IMUs, accelerometers, gyroscopes, magnetometers, FIR sensors, etc.; on-board vehicle computers or processing units (e.g., an electronic control unit, a vehicle infotainment system, etc.); user devices that may be present within a vehicle; and so forth. The special-purpose computing device(s) 702 may be integrated with a vehicle or provided remotely from a vehicle and may receive data requests (e.g., requested for multi-dimensional data) via one or more long-range networks of the network(s) 704.

The special-purpose computing device(s) 702 may be hard-wired to perform the techniques described herein; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 702 may also combine custom hard-wired logic, ASICs, or FPGAs with custom programming to accomplish the techniques. The special-purpose computing device(s) 702 may be desktop computer systems, server computer systems, portable computer systems, handheld devices, networking devices or any other device or combination of devices that incorporate hard-wired and/or programmed logic to implement the techniques. While the computing device(s) 702 may be described herein in the singular, it should be appreciated that multiple computing devices 702 can be provided and functionality can be distributed across the multiple computing devices 702.

The special-purpose computing device(s) 702 may be generally controlled and coordinated by operating system software 720, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device(s) 702 may be controlled by a proprietary operating system. The operating system software 720 may control and schedule computer processes for execution; perform memory management; provide file system, networking, and I/O services; and provide user interface functionality, such as a graphical user interface ("GUI").

The network(s) 704 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 704 can have any suitable communication range associated therewith and can include, for example, global networks (e.g., the Internet), metropolitan area networks (MANs), wide area networks (WANs), local area networks (LANs), or personal area networks (PANs). In addition, the network(s) 704 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 702 can include one or more processors (processor(s)) 708, one or more memory devices 710 (generically referred to herein as memory 710), one or more input/output ("I/O") interface(s) 712, one or more network interfaces 714, and data storage 718. The computing device 702 can further include one or more buses 716 that functionally couple various components of the computing device 702. The data storage 718 may store various engines/components such as an address encoder 724 and an address encoding determination/selection engine 726. Each such engine/component may include logic for performing any of the processes and tasks described earlier in connection with correspondingly named engines/components. In example embodiments, the address encoder 724 and/or the address encoding determination/selection engine 726 may include hard-wired circuitry for performing corresponding techniques and/or circuitry or digital electronic devices such as one or more ASICs or FPGAs that are persistently programmed to perform such techniques.

The bus(es) 716 can include at least one of a system bus, a memory bus, an address bus, or a message bus, and can permit the exchange of information (e.g., data (including computer-executable code), signaling, etc.) between various components of the computing device 702. The bus(es) 716 can include, without limitation, a memory bus or a memory controller, a peripheral bus, an accelerated graphics port, and so forth. The bus(es) 716 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 710 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 710 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 710 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 718 can include removable storage and/or non-removable storage including, but not limited to, magnetic storage, optical disk storage, and/or tape storage. The data storage 718 can provide non-volatile storage of computer-executable instructions and other data. The memory 710 and the data storage 718, removable and/or non-removable, are examples of computer-readable storage media (CRSM) as that term is used herein. The data storage 718 can store computer-executable code, instructions, or the like that can be loadable into the memory 710 and executable by the processor(s) 708 to cause the processor(s) 708 to perform or initiate various operations. The data storage 718 can additionally store data that can be copied to memory 710 for use by the processor(s) 708 during the execution of the computer-executable instructions. Moreover, output data generated as a result of execution of the computer-executable instructions by the processor(s) 708 can be stored initially in memory 710 and can ultimately be copied to data storage 718 for non-volatile storage.

More specifically, the data storage 718 can store one or more operating systems (O/S) 720 and one or more database management systems (DBMS) 722 configured to access the memory 710 and/or one or more external datastore(s) (not depicted) potentially via one or more of the networks 704. In addition, the data storage 718 may further store one or more program modules, applications, engines, computer-executable code, scripts, or the like such as the address encoder 724 and the address encoding determination/selection engine 726, which may be implemented as software and/or firmware that includes computer-executable instructions (e.g., computer-executable program code) loadable into the memory 710 for execution by one or more of the processor(s) 708 to perform any of the techniques described herein.

Although not depicted in FIG. 7, the data storage 718 can further store various types of data utilized by engines/components of the computing device 702. Such data may include, without limitation, address encodings, multi-dimensional data, bit representations of coordinate values, etc. Any data stored in the data storage 718 can be loaded into the memory 710 for use by the processor(s) 708 in executing computer-executable program code. In addition, any data stored in the data storage 718 can potentially be stored in one or more external datastores that are accessible via the DBMS 722 and loadable into the memory 710 for use by the processor(s) 708 in executing computer-executable instructions/program code.

The processor(s) 708 can be configured to access the memory 710 and execute computer-executable instructions/program code loaded therein. For example, the processor(s) 708 can be configured to execute computer-executable instructions/program code of the various engines/components of the FOV semantics computing machine 724 to cause or facilitate various operations to be performed in accordance with one or more embodiments of the invention. The processor(s) 708 can include any suitable processing unit capable of accepting data as input, processing the input data in accordance with stored computer-executable instructions, and generating output data. The processor(s) 708 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 708 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 708 can be made capable of supporting any of a variety of instruction sets.

Referring now to other illustrative components depicted as being stored in the data storage 718, the O/S 720 can be loaded from the data storage 718 into the memory 710 and can provide an interface between other application software executing on the computing device 702 and hardware resources of the computing device 702. More specifically, the O/S 720 can include a set of computer-executable instructions for managing hardware resources of the computing device 702 and for providing common services to other application programs. In certain example embodiments, the O/S 720 can include or otherwise control execution of one or more of the engines/program modules stored in the data storage 718. The O/S 720 can include any operating system now known or which can be developed in the future including, but not limited to, any server operating system, any mainframe operating system, or any other proprietary or non-proprietary operating system.

The DBMS 722 can be loaded into the memory 710 and can support functionality for accessing, retrieving, storing, and/or manipulating data stored in the memory 710, data stored in the data storage 718, and/or data stored in external datastore(s). The DBMS 722 can use any of a variety of database models (e.g., relational model, object model, etc.) and can support any of a variety of query languages. The DBMS 722 can access data represented in one or more data schemas and stored in any suitable data repository. Datastore(s) that may be accessible by the computing device 702 via the DBMS 722, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 702, the input/output (I/O) interface(s) 712 can facilitate the receipt of input information by the computing device 702 from one or more I/O devices as well as the output of information from the computing device 702 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 702 or can be separate therefrom. The I/O devices can further include, for example, any number of peripheral devices such as data storage devices, printing devices, and so forth.

The I/O interface(s) 712 can also include an interface for an external peripheral device connection such as universal serial bus (USB), FireWire, Thunderbolt, Ethernet port or other connection protocol that can connect to one or more networks. The I/O interface(s) 712 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 702 can further include one or more network interfaces 714 via which the computing device 702 can communicate with any of a variety of other systems, platforms, networks, devices, and so forth. The network interface(s) 714 can enable communication, for example, with the sensors 704 and/or one or more other devices via one or more of the network(s) 706. In example embodiments, the network interface(s) 714 provide a two-way data communication coupling to one or more network links that are connected to one or more of the network(s) 706. For example, the network interface(s) 714 may include an integrated services digital network (ISDN) card, a cable modem, a satellite modem, or a modem to provide a data communication connection to a corresponding type of telephone line. As another non-limiting example, the network interface(s) 714 may include a local area network (LAN) card to provide a data communication connection to a compatible LAN (or a wide area network (WAN) component to communicate with a WAN). Wireless links may also be implemented. In any such implementation, the network interface(s) 714 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 704 and the signals on network links and through the network interface(s) 714, which carry the digital data to and from the computing device 702, are example forms of transmission media. In example embodiments, the computing device 702 can send messages and receive data, including program code, through the network(s) 704, network links, and network interface(s) 714. For instance, in the Internet example, a server might transmit a requested code for an application program through the Internet, the ISP, a local network, and a network interface 714. The received code may be executed by a processor 708 as it is received, and/or stored in the data storage 718, or other non-volatile storage for later execution.

It should be appreciated that the engines depicted in FIG. 7 as part of the computing device 702 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 702 and/or hosted on other computing device(s) accessible via one or more of the network(s) 704, can be provided to support functionality provided by the engines depicted in FIG. 7 and/or additional or alternate functionality. In addition, engines that support functionality described herein can be implemented, at least partially, in hardware and/or firmware and can be executable across any number of computing devices 702 in accordance with any suitable computing model such as, for example, a client-server model, a peer-to-peer model, and so forth.

It should further be appreciated that the computing device 702 can include alternate and/or additional hardware, software, and/or firmware components beyond those described or depicted without departing from the scope of the invention. More particularly, it should be appreciated that software, firmware, and/or hardware components depicted as forming part of the computing device 702 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) XXX. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being redefined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A computer-implemented method for memory address encoding of multi-dimensional data, the method comprising:
    determining a memory access pattern indicative of relative frequencies of access corresponding to respective directions;
    adjusting an address encoding to the multi-dimensional data based on the memory access pattern, wherein the adjusting of the access encoding comprises selectively applying an access encoding absent from coordinate bias in response to the relative frequencies of access corresponding to the respective directions being equal or differing by less than a threshold range or a threshold amount;
    applying the adjusted address encoding to the multi-dimensional data to obtain a memory address for the multi-dimensional data; and
    storing the multi-dimensional data at the memory address.

2. The computer-implemented method of claim 1, wherein the adjusting of the address encoding is in response to a memory read or memory write request.

3. The computer-implemented method of claim 1, wherein the adjusting of the access encoding comprises applying a coordinate bias corresponding to a direction having a highest frequency of access.

4. The computer-implemented method of claim 1, wherein the adjusting of the address encoding comprises obtaining bit representations of a coordinate in each of coordinate axes, wherein the bit representations have a lower number of bits compared to other bit representations that represent the coordinate.

5. The computer-implemented method of claim 4, wherein the applying of the adjusted address encoding comprises:
    in response to the relative frequencies of access in the respective directions being equal or differing by less than a threshold range:
        adding leading zeros such that the bit representations in each of the coordinate axes have equal numbers of bits; and
        obtaining the memory address by appending first bit values that each correspond to a bit position of a first significance of each of different coordinate axes to second bit values that each correspond to a bit position of a second significance of each of the different coordinate axes.

6. The computer-implemented method of claim 5, further comprising:
    appending leading zeros to the obtained memory address to satisfy a particular bit length.

7. The computer-implemented method of claim 1, wherein the adjusting of the address encoding comprises:
    swizzling an order in which bit representations of different coordinate values are interleaved.

8. The computer-implemented method of claim 1, wherein the multi-dimensional data comprises three spatial dimensions and a time dimension.

9. A system for memory address encoding of multi-dimensional data, the system comprising:
    one or more processors; and
    one or more memories storing computer-executable instructions that, when executed by the one or more processors, cause the one or more processors to:
        determine a memory access pattern of a cache memory or a main memory, wherein the memory access pattern is indicative of relative frequencies of access corresponding to respective directions;
        adjust an address encoding to the multi-dimensional data based on the memory access pattern, wherein the adjusting of the access encoding comprises selectively applying an access encoding absent from coordinate bias in response to the relative frequencies of access corresponding to the respective directions being equal or differing by less than a threshold range or a threshold amount;
        apply the adjusted address encoding to the multi-dimensional data to obtain a memory address for the multi-dimensional data; and
        store the multi-dimensional data at the memory address.

10. The system of claim 9, wherein the adjusting of the address encoding is in response to a memory read or memory write request.

11. The system of claim 9, wherein the adjusting of the access encoding comprises applying a coordinate bias corresponding to a direction having a highest frequency of access.

12. The system of claim 9, wherein the adjusting of the address encoding comprises obtaining bit representations of a coordinate in each of coordinate axes, wherein the bit representations have a lower number of bits compared to other bit representations that represent the coordinate.

13. The system of claim 12, wherein the applying of the adjusted address encoding comprises:
    in response to the relative frequencies of access in the respective directions being equal or differing by less than a threshold range:
        adding leading zeros such that the bit representations in each of the coordinate axes have equal numbers of bits; and
        obtaining the memory address by appending first bit values that each correspond to a bit position of a first significance of each of different coordinate axes to second bit values that each correspond to a bit position of a second significance of each of the different coordinate axes.

14. The system of claim 11, wherein the adjusting of the address encoding comprises:
    swizzling an order in which bit representations of different coordinate values are interleaved.

15. The system of claim 9, wherein the multi-dimensional data comprises three spatial dimensions and a time dimension.

16. A computer program product for memory address encoding of multi-dimensional data that includes first multi-dimensional data and second multi-dimensional data, the computer program product comprising a non-transitory computer-readable medium readable by a processing circuit, the non-transitory computer-readable medium storing instructions executable by the processing circuit to cause a method to be performed, the method comprising:

determining a memory access pattern of a main memory or a cache memory;

adjusting an address encoding to the multi-dimensional data based on the memory access pattern, wherein the adjusting of the address encoding comprises obtaining bit representations of a coordinate in each of coordinate axes, wherein the bit representations have a lower number of bits compared to other bit representations that represent the coordinate;

applying the adjusted address encoding to the multi-dimensional data to obtain a memory address for the multi-dimensional data; and storing the multi-dimensional data at the memory address.

* * * * *